United States Patent
Akiyama et al.

(10) Patent No.: US 10,298,808 B2
(45) Date of Patent: May 21, 2019

(54) IMAGE PROCESSING APPARATUS, IMAGE PROCESSING METHOD, AND RECORDING MEDIUM

(71) Applicants: Takumi Akiyama, Kanagawa (JP); Yuki Imaizumi, Kanagawa (JP)

(72) Inventors: Takumi Akiyama, Kanagawa (JP); Yuki Imaizumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/878,784

(22) Filed: Jan. 24, 2018

(65) Prior Publication Data
US 2018/0262645 A1 Sep. 13, 2018

(30) Foreign Application Priority Data

Mar. 10, 2017 (JP) ................................. 2017-045856
Mar. 14, 2017 (JP) ................................. 2017-048202

(51) Int. Cl.
| | |
|---|---|
| H04N 1/401 | (2006.01) |
| H04N 1/409 | (2006.01) |
| H04N 1/00 | (2006.01) |

(52) U.S. Cl.
CPC ......... *H04N 1/401* (2013.01); *H04N 1/00798* (2013.01); *H04N 1/409* (2013.01); *H04N 2201/0094* (2013.01)

(58) Field of Classification Search
CPC .... H04N 1/401; H04N 1/409; H04N 1/00798; H04N 2201/0094
See application file for complete search history.

(56) References Cited

U.S. PATENT DOCUMENTS

| | | | |
|---|---|---|---|
| 9,811,767 B2 | 11/2017 | Akiyama | |
| 2010/0302602 A1* | 12/2010 | Mikami | ................. H04N 1/401 358/406 |
| 2012/0189200 A1* | 7/2012 | Nakamura | ......... H04N 1/40062 382/167 |
| 2017/0171407 A1 | 6/2017 | Akiyama | |

FOREIGN PATENT DOCUMENTS

| | | |
|---|---|---|
| JP | 2002-232654 | 8/2002 |
| JP | 2004-112297 | 4/2004 |
| JP | 2009-206570 | 9/2009 |
| JP | 4330164 | 9/2009 |
| JP | 2013-093674 | 5/2013 |
| JP | 2014-103486 | 6/2014 |

* cited by examiner

*Primary Examiner* — Quang N Vo
(74) *Attorney, Agent, or Firm* — IPUSA, PLLC

(57) ABSTRACT

An image processing apparatus includes a definer for defining pixel areas in image data acquired on a per-line basis, each pixel area being used for calculating a pixel value of an interpolation pixel for interpolating a missing pixel; a read out controller for accessing, in a memory storing the image data of one line, a leading address among addresses corresponding to pixels in an Nth pixel area, and reading out pixel values of the pixels in the Nth pixel area; and a calculator for calculating a pixel value of an Nth interpolation pixel by using the pixel values of the Nth pixel area. The read out controller accesses a leading address among addresses corresponding to pixels in an (N+1)th pixel area, and reads out pixel values of the pixels in the (N+1)th pixel area, after the pixel value of the Nth interpolation pixel is calculated.

15 Claims, 24 Drawing Sheets

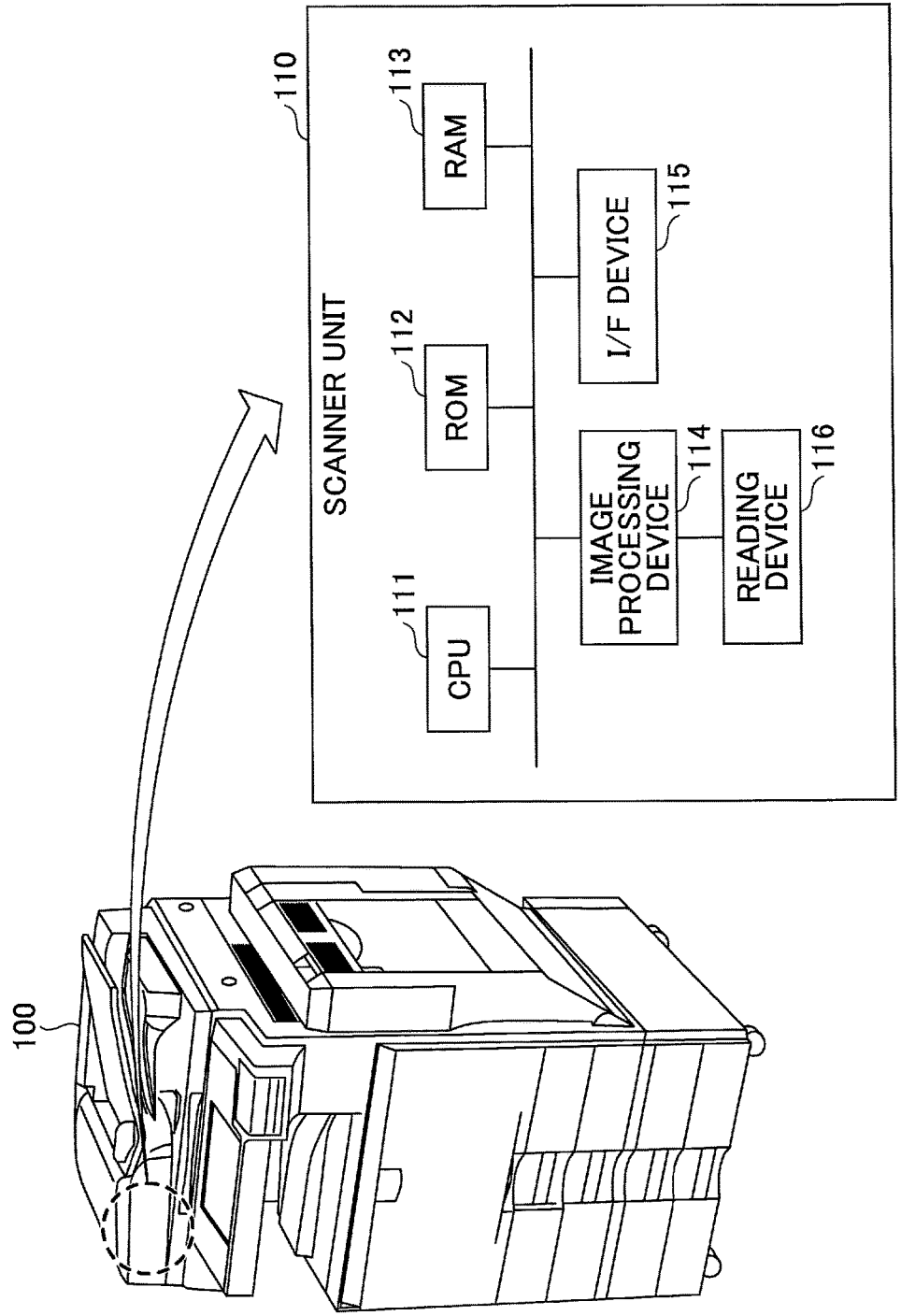

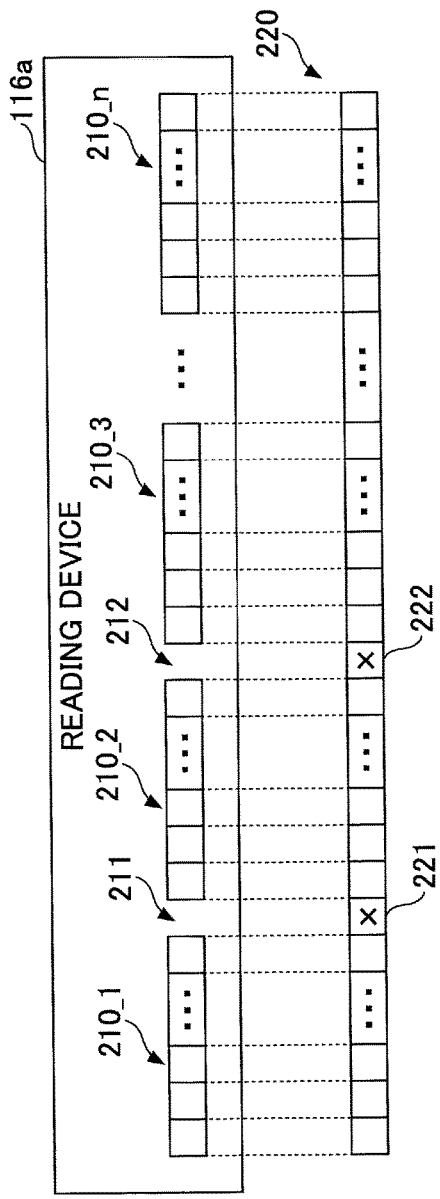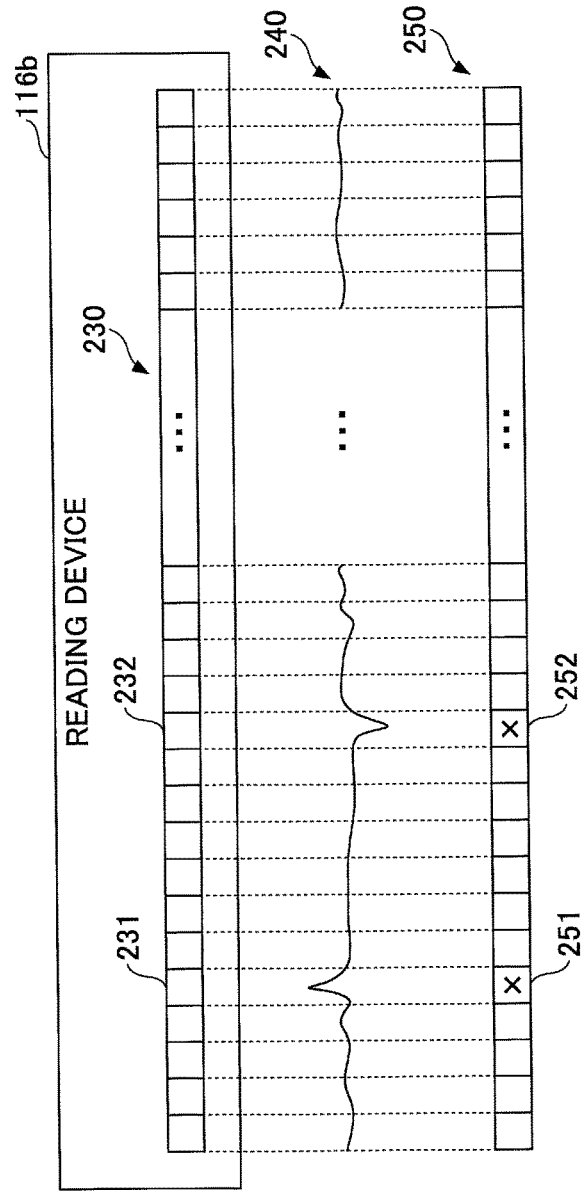
FIG.2A
FIG.2B

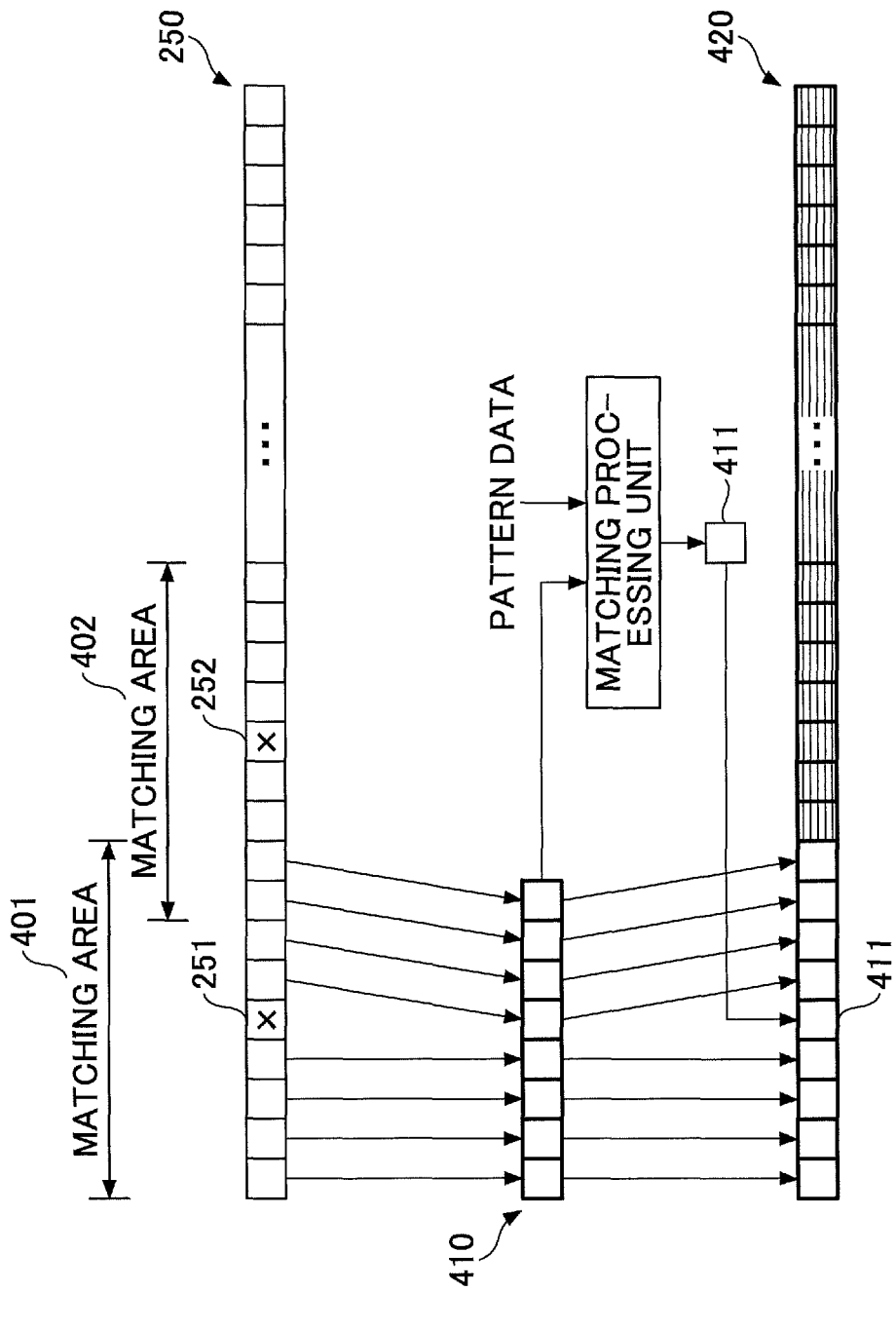

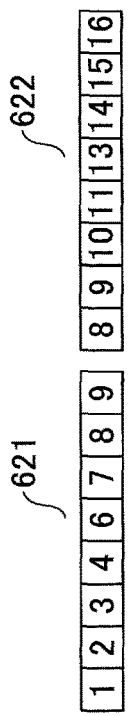
FIG.6A IMAGE DATA STORED IN MATCHING PROCESS BUFFER 410
FIG.6B IMAGE DATA STORED IN MATCHING PROCESS BUFFER 520

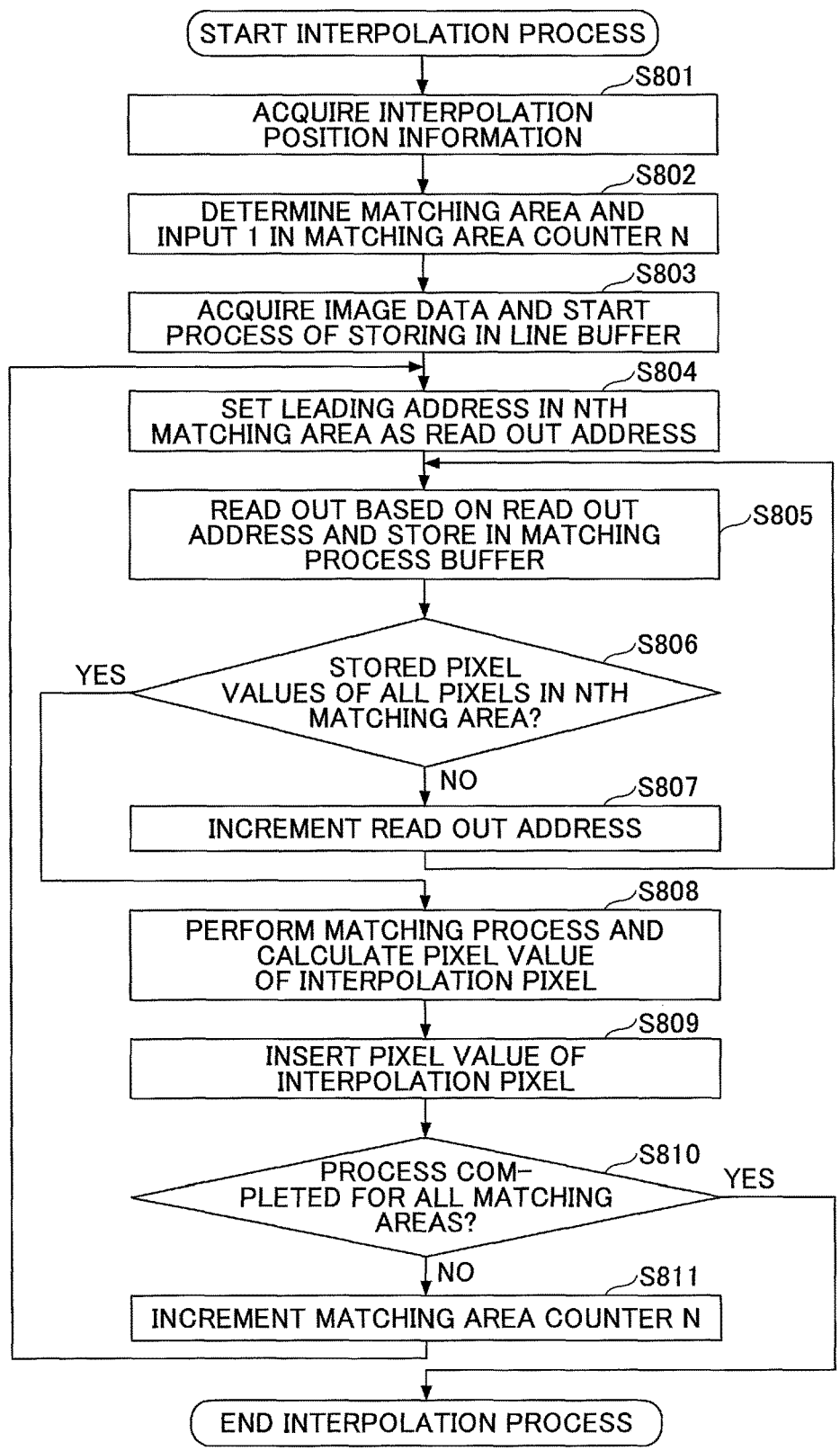

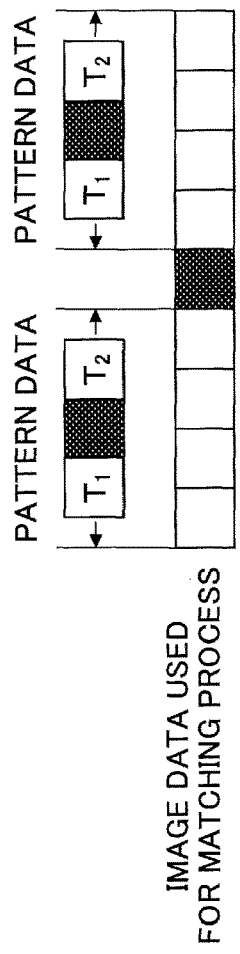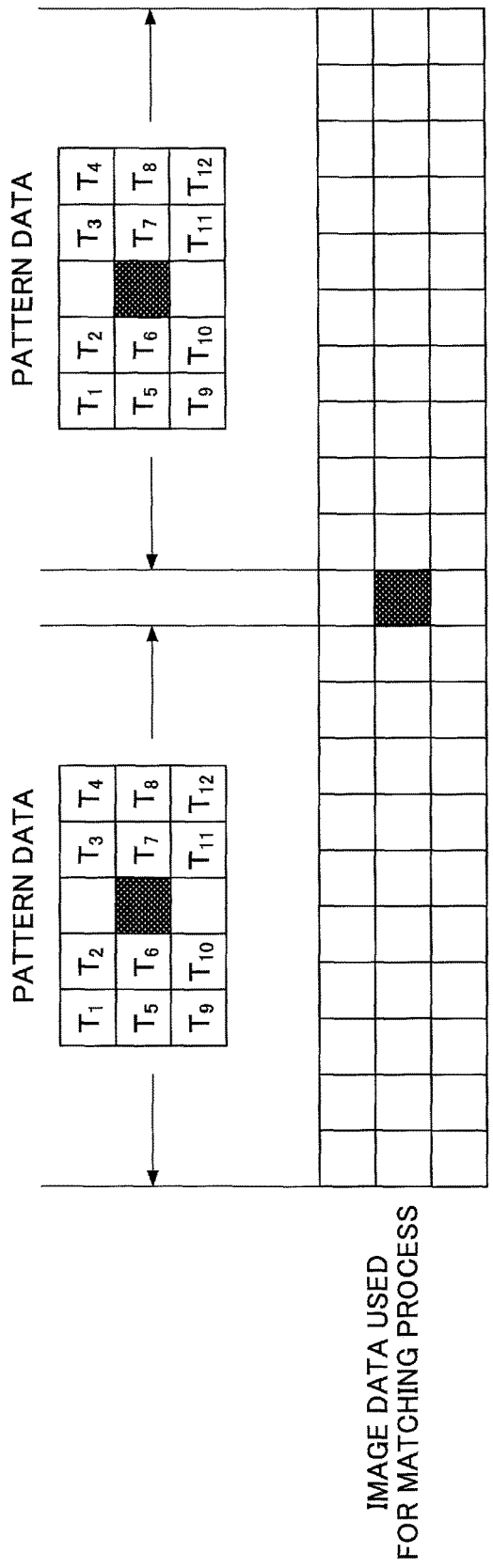

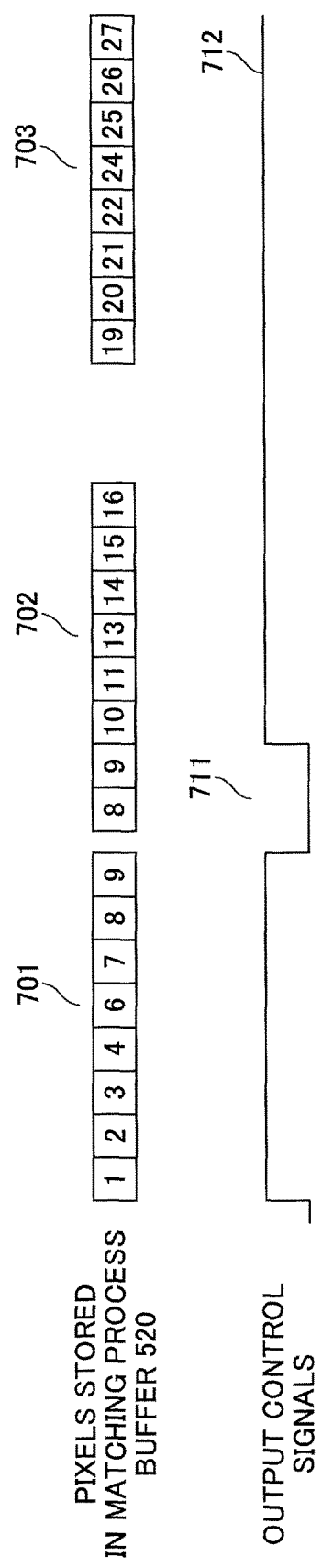

IMAGE PROCESSING APPARATUS, IMAGE PROCESSING METHOD, AND RECORDING MEDIUM

CROSS-REFERENCE TO RELATED APPLICATION

The present application claims priority under 35 U.S.C. § 119 to Japanese Patent Application No. 2017-045856, filed on Mar. 10, 2017 and Japanese Patent Application No. 2017-048202, filed on Mar. 14, 2017, the contents of which are incorporated herein by reference in their entirety.

BACKGROUND OF THE INVENTION

1. Field of the Invention

The present invention relates to an image processing apparatus, an image processing method, and a recording medium.

2. Description of the Related Art

In the related art, an image forming apparatus such as a multifunction peripheral (MFP) is equipped with a scanner unit that scans an original document. In the scanner unit, an image processing device processes signals detected by a reading device, to generate image data of the scanned original document.

Generally, the image processing device in the scanner unit includes an interpolation function. Specifically, when there is a missing part in the detected signals, the interpolation function interpolates a pixel value of the corresponding pixel (missing pixel), with a pixel value of another pixel. As a specific example, Patent Document 1 below discloses an interpolation method for interpolating missing pixels, by performing pattern matching by using a pixel area in the vicinity of the missing pixel, and extracting a pattern similar to a pattern including the missing pixel.

Patent Document 1: Japanese Unexamined Patent Application Publication No. 2013-093674

SUMMARY OF THE INVENTION

An aspect of the present invention provides an image processing apparatus, an image processing method, and a recording medium, in which one or more of the disadvantages of the related art are reduced.

According to one aspect of the present invention, there is provided an image processing apparatus including a definer configured to define one or more pixel areas in image data that is acquired on a per-line basis in a main scanning direction, each of the one or more pixel areas being used for calculating a pixel value of an interpolation pixel for interpolating a missing pixel; a read out controller configured to access, in a memory storing the image data of one line, a leading address among addresses corresponding to respective pixels included in an Nth pixel area of the pixel areas defined by the definer, the N being an integer of one or more, and to sequentially read out pixel values of the respective pixels included in the Nth pixel area; and a calculator configured to calculate a pixel value of an Nth interpolation pixel of the interpolation pixels by using the pixel values of the respective pixels included in the Nth pixel area read out by the read out controller, wherein the read out controller accesses, in the memory storing the image data of one line, a leading address among addresses corresponding to respective pixels included in an (N+1)th pixel area of the defined pixel areas, and sequentially reads out pixel values of the respective pixels included in the (N+1)th pixel area, upon completion of the calculation of the pixel value of the Nth interpolation pixel.

BRIEF DESCRIPTION OF THE DRAWINGS

FIG. 1 is an example of a hardware block diagram of a scanner unit according to a first embodiment of the present invention;

FIGS. 2A and 2B are diagrams for describing the cause of the occurrence of missing pixels;

FIGS. 4A and 4B are diagrams illustrating an example of interpolation process in the case where matching areas of adjacent missing pixels overlap each other, by using a general image processing device;

FIG. 6A illustrates pixels stored in a matching process buffer of a general image processing device;

FIG. 6B illustrates pixels stored in a matching process buffer of the image processing device according to the first embodiment of the present invention;

FIG. 8 is a flowchart illustrating the flow of the interpolation process by the image processing device according to the first embodiment of the present invention;

FIGS. 9A and 9B are diagrams illustrating examples of a matching process according to the first embodiment of the present invention;

FIG. 14 is a diagram illustrating an example of pixels stored in the matching process buffer and an output control signal for restricting output to the output buffer, at respective timings, according to the third embodiment of the present invention;

DETAILED DESCRIPTION OF THE PREFERRED EMBODIMENTS

Figure 3A:
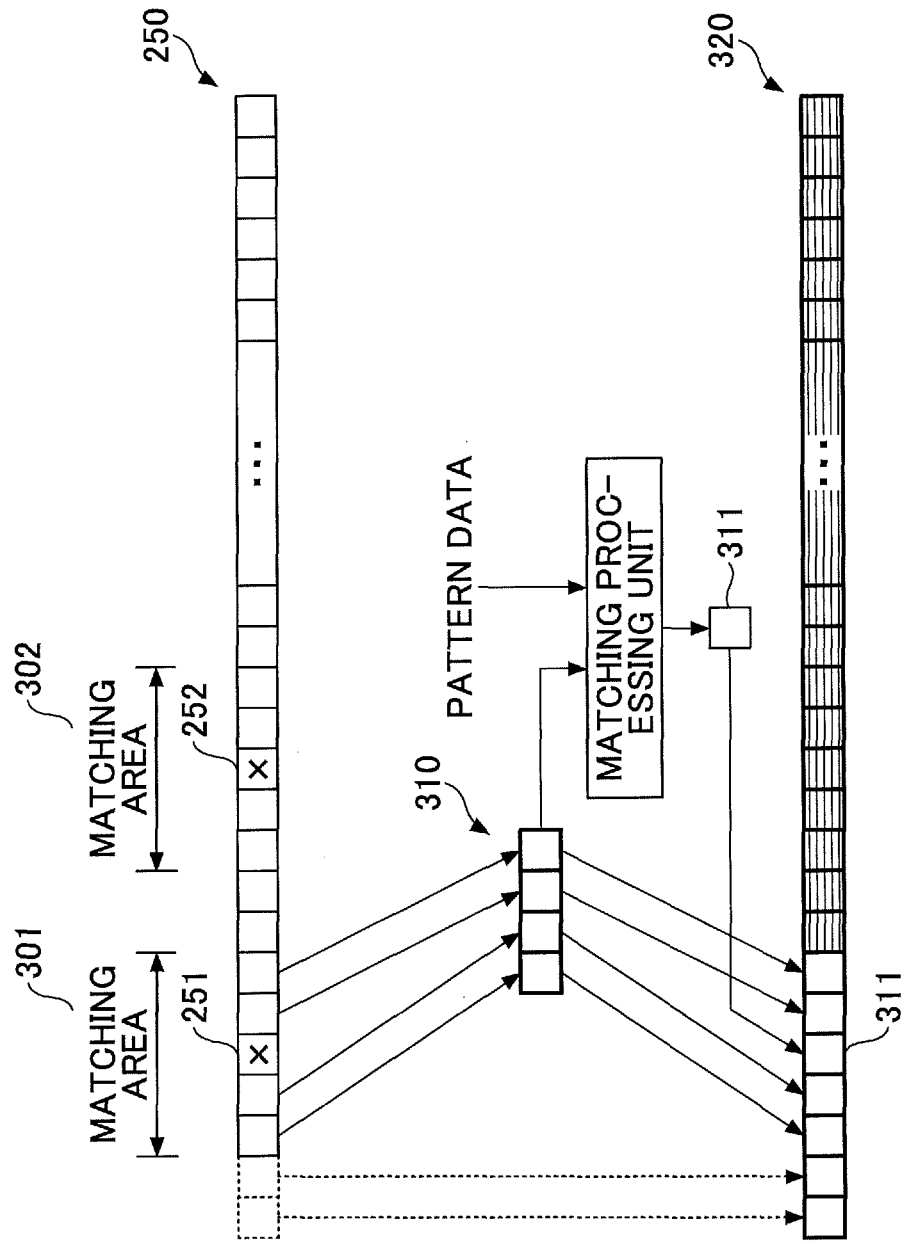
FIGS. 3A and 3B are diagrams illustrating an example of an interpolation process in the case where matching areas of adjacent missing pixels do not overlap each other, by using a general image processing device.

In the interpolation method of the related art, it is assumed that a pixel area used for pattern matching for an Nth missing pixel, and a pixel area used for pattern matching for a (N+1)th missing pixel, do not overlap each other.

On the other hand, in order to improve the interpolation accuracy, for example, there are cases where pixel areas used for pattern matching are expanded. In this case, it is conceivable that a pixel area used for pattern matching for an Nth missing pixel, and a pixel area used for pattern matching for a (N+1)th missing pixel, overlap each other. In such a case, the interpolation method of the related art described above has a problem that the pixel value of the interpolation pixel cannot be appropriately calculated.

A problem to be solved by an embodiment of the present invention is to make it possible to calculate a pixel value of an interpolation pixel, even when a pixel area used for calculating the pixel value of the interpolation pixel overlaps another pixel area.

Embodiments of the present invention will be described by referring to the accompanying drawings. In the specification and drawings of the embodiments, the elements having substantially the same functions are denoted by the same reference numerals, and overlapping descriptions are omitted.

First Embodiment

<1. Hardware Configuration of Scanner Unit-First Embodiment>

First, a hardware configuration of a scanner unit including an image processing device according to a first embodiment will be described. FIG. 1 is an example of a hardware block diagram of a scanner unit.

As illustrated in FIG. 1, a scanner unit 110 is installed in an image forming apparatus 100 such as an MFP. The scanner unit 110 includes a Central Processing Unit (CPU) 111, a Read-Only Memory (ROM) 112, and a Random Access Memory (RAM) 113. Furthermore, the scanner unit includes an image processing device 114, an interface (I/F) device 115, and a reading device 116.

The CPU 111 executes various programs stored in the ROM 112 and controls the entire scanner unit 110 (or the entire image forming apparatus 100 including units other than the scanner unit 110).

The ROM 112 is a nonvolatile memory, and functions as a main storage unit that stores various programs to be executed by the CPU 111. The RAM 113 is a volatile memory and functions as a main storage unit that provides a work area to be expanded when various programs stored in the ROM 112 are executed by the CPU 111.

The image processing device 114 is an exclusive-use integrated circuit that processes and outputs image data of a scanned document generated based on signals detected by the reading device 116.

The I/F device 115 is connected to other units in the image forming apparatus 100, and functions as a connecting unit for sending and receiving image data, etc., processed by the image processing device 114.

In the reading device 116, a plurality of sensor chips are arranged in a row, such that the reading device 116 can detect a range larger than the document width (alternatively, a long line sensor may be arranged, such that the reading device 116 can detect a range larger than the document width). The reading device 116 generates image data of the scanned document based on signals detected by scanning the document, and inputs the generated image data in the image processing device 114.

<2. Cause of Occurrence of Missing Pixel-First Embodiment>

Next, with respect to the image data generated based on the signals detected by the reading device 116, the cause of the occurrence of missing pixels will be described. FIGS. 2A and 2B are diagrams for describing the cause of the occurrence of missing pixels.

FIG. 2A is a diagram for describing the cause of the occurrence of missing pixels in the reading device 116a in which the plurality of sensor chips 210_1 to 210_n are arranged in a row. As illustrated in FIG. 2A, when the plurality of sensor chips 210_1 to 210_n are arranged in a row, physical gaps (see gaps 211 and 212, etc.) are generated between the sensor chips, and at positions corresponding to the gaps, signals cannot be detected.

Therefore, in image data 220 generated based on the signals detected by the reading device 116a, pixels 221 and 222 respectively corresponding to the gaps 211 and 212, become missing pixels.

FIG. 2B is a diagram for describing the cause of the occurrence of missing pixels in the reading device 116b in which a long line sensor 230 is arranged. In the case of the long line sensor 230, missing pixels, which are caused by physical gaps, will not be generated. However, as illustrated in FIG. 2B, when noise is included in detected signals 240, in image data 250 generated based on the signals 240, pixels 251 and 252 respectively corresponding to elements 231 and 232, become missing pixels.

Note that not only the long line sensor 230, but also in the sensor chips 210_1 to 210_n as illustrated in FIG. 2A, when noise is included in the detected signals, similarly, the corresponding pixels will become missing pixels.

As described above, in image data generated based on signals detected by the reading device 116, missing pixels may be generated due to various reasons. However, in the following, as a matter of simplification, a description is given of a case where the image processing device 114 performs an interpolation process with respect to missing pixels that occur due to the reason described with reference to FIG. 2B.

Note that in the following, first, a description is given of a general interpolation process, in which a pixel area (referred to as "matching area") used for pattern matching around a missing pixel, does not overlap a matching area of another missing pixel (see <3.1> below). Subsequently, a description is given of the reason why a pixel value of an interpolation pixel cannot be appropriately calculated in a general interpolation process, when the matching area overlaps another matching area (see <3.2> (1) below). Furthermore, even in such a case, it is indicated that by performing the interpolation process by using the image processing device 114 according to the present embodiment, it is possible to appropriately calculate the pixel value of the interpolation pixel (see <3.2> (2) below).

<3. Interpolation Process-First Embodiment>

<3.1 Interpolation Process When Matching Areas Do Not Overlap (General Image Processing Device)-First Embodiment>

Figure 3B:
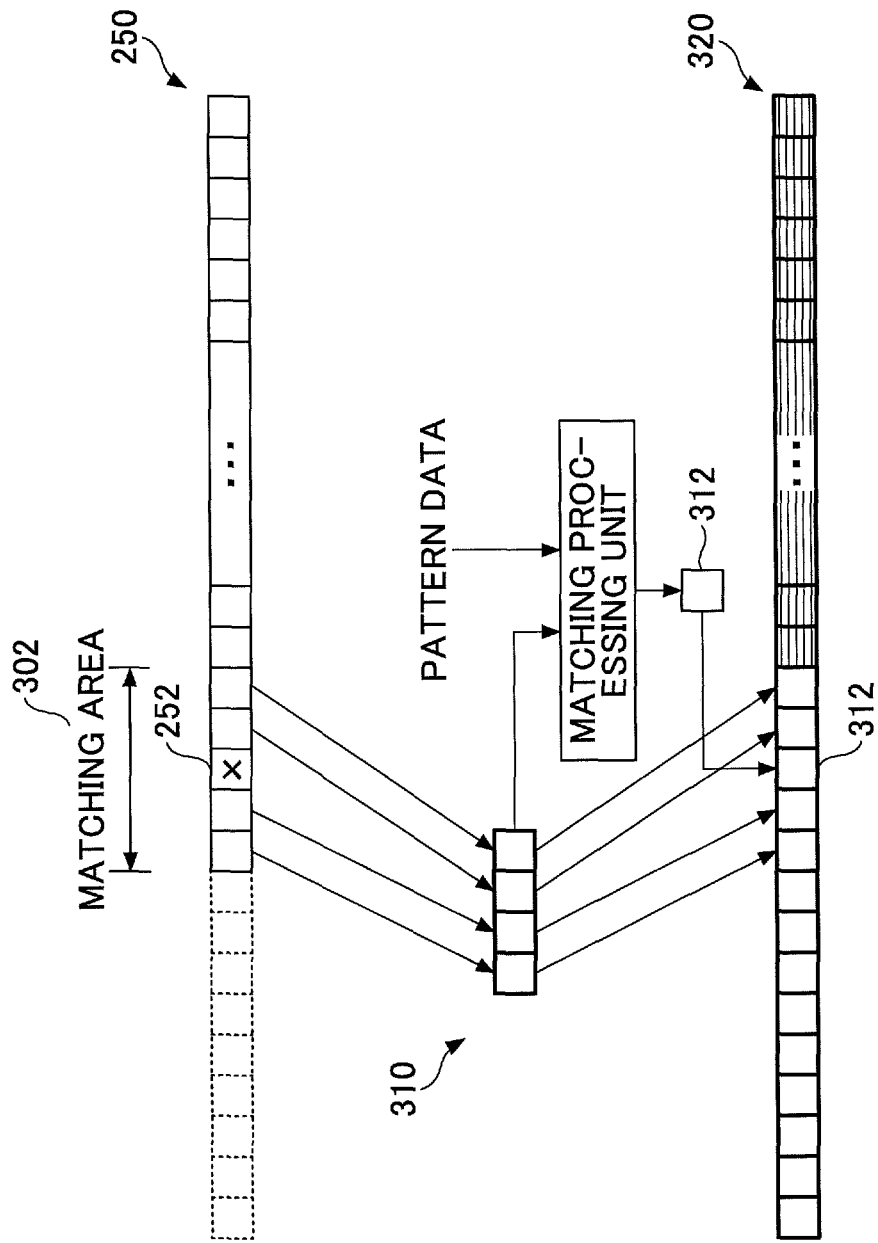

FIGS. 3A and 3B are diagrams illustrating an example of an interpolation process in the case where matching areas of adjacent missing pixels do not overlap each other, and illustrating a case where an interpolation process is executed by using a general image processing device. In executing the interpolation process, it is assumed that in the image processing device, it is known in advance that an event, which is a cause of the occurrence of a missing pixel, has occurred, and the matching area has been determined.

As illustrated in FIG. 3A, in a general image processing device, the image data 250 of one line in the main scanning direction is sequentially acquired as a processing target, and is output as a pixel value of each pixel of image data 320 (see dotted line arrows).

Then, when a matching area 301 becomes the processing target, the pixel values of the respective pixels that are processing targets are stored in a buffer for matching processes 310 (matching process buffer 310) (see solid line arrows). Then, when the pixel values of respective pixels included in the matching area 301 are stored in the matching process buffer 310, a matching processing unit performs a matching process based on previously prepared pattern data. Accordingly, the matching processing unit calculates a pixel value 311 of an interpolation pixel.

When the pixel value 311 of the interpolation pixel is calculated, in the general image processing device, the pixel value 311 of the interpolation pixel is inserted at a position corresponding to the missing pixel, among the pixels stored in the matching process buffer 310. Then, the pixel value 311 of the interpolation pixel is output together with the pixel values of the respective pixels stored in the matching process buffer 310, as the pixel values of the respective pixels of the image data 320.

After the matching process on the matching area 301 is completed, when a matching area 302 becomes a processing target, as illustrated in FIG. 3B, in the general image processing device, the pixel values of the respective pixels that are processing targets are stored again in the matching process buffer 310.

When the pixel values of the respective pixels included in the matching area 302 are stored in the matching process buffer 310, the matching processing unit performs a matching process based on previously prepared pattern data. Accordingly, the matching processing unit calculates a pixel value 312 of an interpolation pixel.

When the pixel value 312 of the interpolation pixel is calculated, in the general image processing device, the pixel value 312 of the interpolation pixel is inserted at the position corresponding to the missing pixel, among the pixels stored in the matching process buffer 310. Then, the pixel value 312 of the interpolation pixel is output together with the pixel values of the respective pixels stored in the matching process buffer 310, as the pixel values of the respective pixels of the image data 320.

In this way, when the matching area does not overlap any other matching area, by sequentially performing an interpolation process on the acquired processing target by using the matching process buffer 310 having a predetermined size, the pixel value of the interpolation pixel can be appropriately calculated.

<3.2 Interpolation Process When Matching Areas Overlap (General Image Processing Device and Image Processing Device 114)-First Embodiment>

Next, a description is given of an interpolation process in a case where the matching areas are expended and the matching areas of adjacent missing pixels overlap each other, for a case of using a general image processing device and a case of using the image processing device 114 according to the present embodiment.

(1) Interpolation Process in Case of Using General Image Processing Device

Figure 4B:
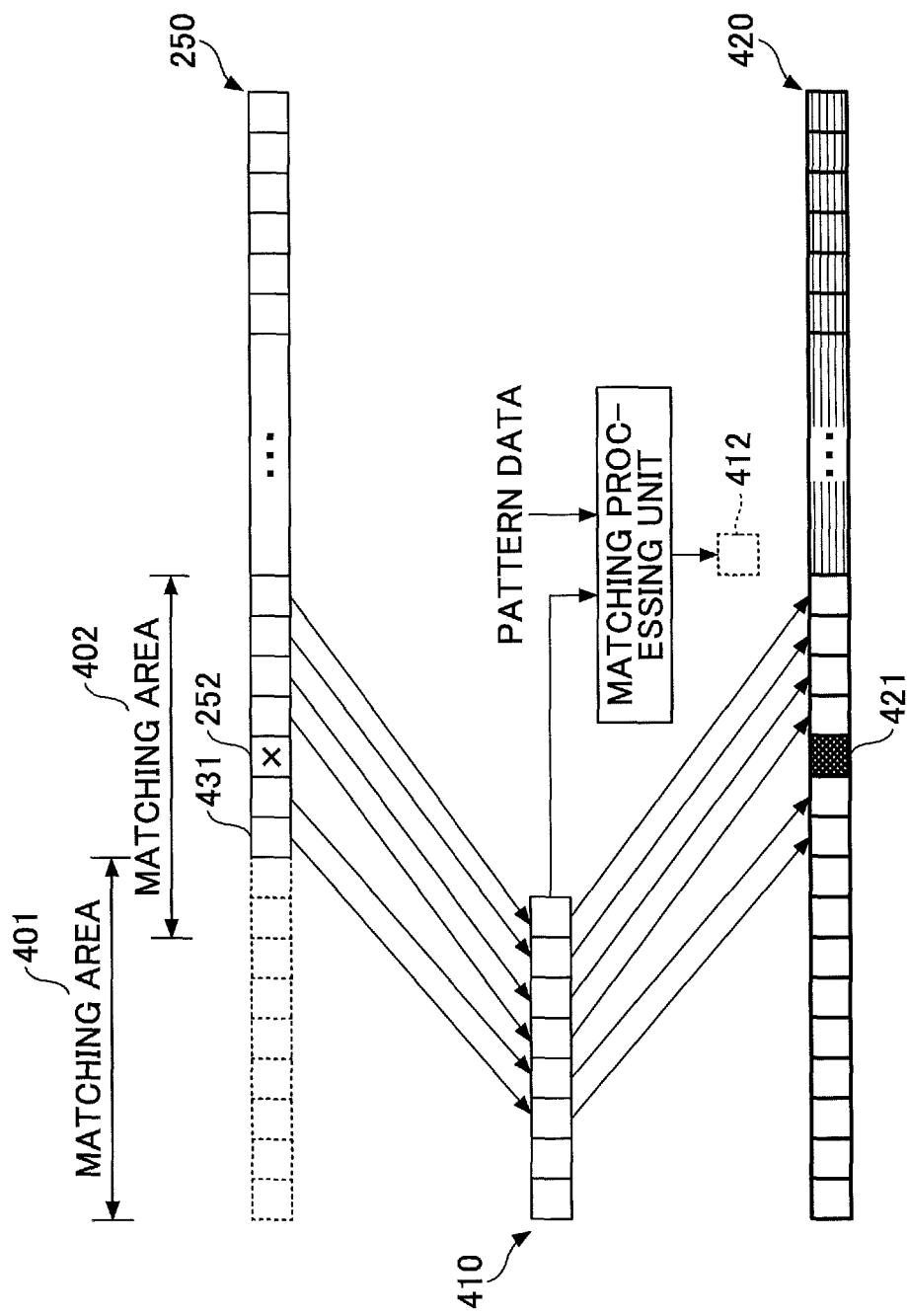

First, an interpolation process in the case of using a general image processing device will be described. FIGS. 4A and 4B are diagrams illustrating an example of interpolation process in the case where matching areas of adjacent missing pixels overlap each other, and illustrating a case where a general image processing device executes an interpolation process.

As illustrated in FIG. 4A, a general image processing device sequentially acquires the image data 250 of one line in the main scanning direction as a processing target, and stores the image data 250 in a matching process buffer 410. Tn the example of FIG. 4A, since the matching areas are expanded (see matching areas 401 and 402), the matching process buffer 410 is also larger than the matching process buffer 310.

When the pixel values of the respective pixels included in the matching area 401 is stored in the matching process buffer 410, the matching processing unit performs a matching process based on previously prepared pattern data. Accordingly, the matching processing unit calculates a pixel value 411 of an interpolation pixel.

When the pixel value 411 of the interpolation pixel is calculated, in the general image processing device, the pixel value 411 of the interpolation pixel is inserted at the position corresponding to a missing pixel, among the pixels stored in the matching process buffer 410. Then, the pixel value 411 of the interpolation pixel is output together with the pixel values of the respective pixels stored in the matching process buffer 410, as the pixel values of the respective pixels of image data 420.

Upon completion of the matching process for the matching area 401, as illustrated in FIG. 4B, in a general image processing device, a pixel 431 next to the processed pixels in the image data 250, is set as the pixel that is the processing target, and the pixel value is stored in the matching process buffer 410.

Therefore, in the case of a general image processing device, it is not possible to store all of the pixel values of the respective pixels included in the matching area 402, in the matching process buffer 410. In the example of FIG. 4B, pixel values of two pixels (pixel values of pixels included in the area overlapping the matching area 401) cannot be stored in the matching process buffer 410. As a result, the matching processing unit cannot perform the matching process by using the pixel values of the pixels included in the matching area 402, and a pixel value 412 of the interpolation pixel cannot be appropriately calculated.

As described above, in a general image processing device, when the matching area of a missing pixel overlaps another matching area of an adjacent missing pixel, the pixel value of the interpolation pixel cannot be appropriately calculated, and in the image data to be output 420, a missing pixel 421 will occur.

Figure 5A:
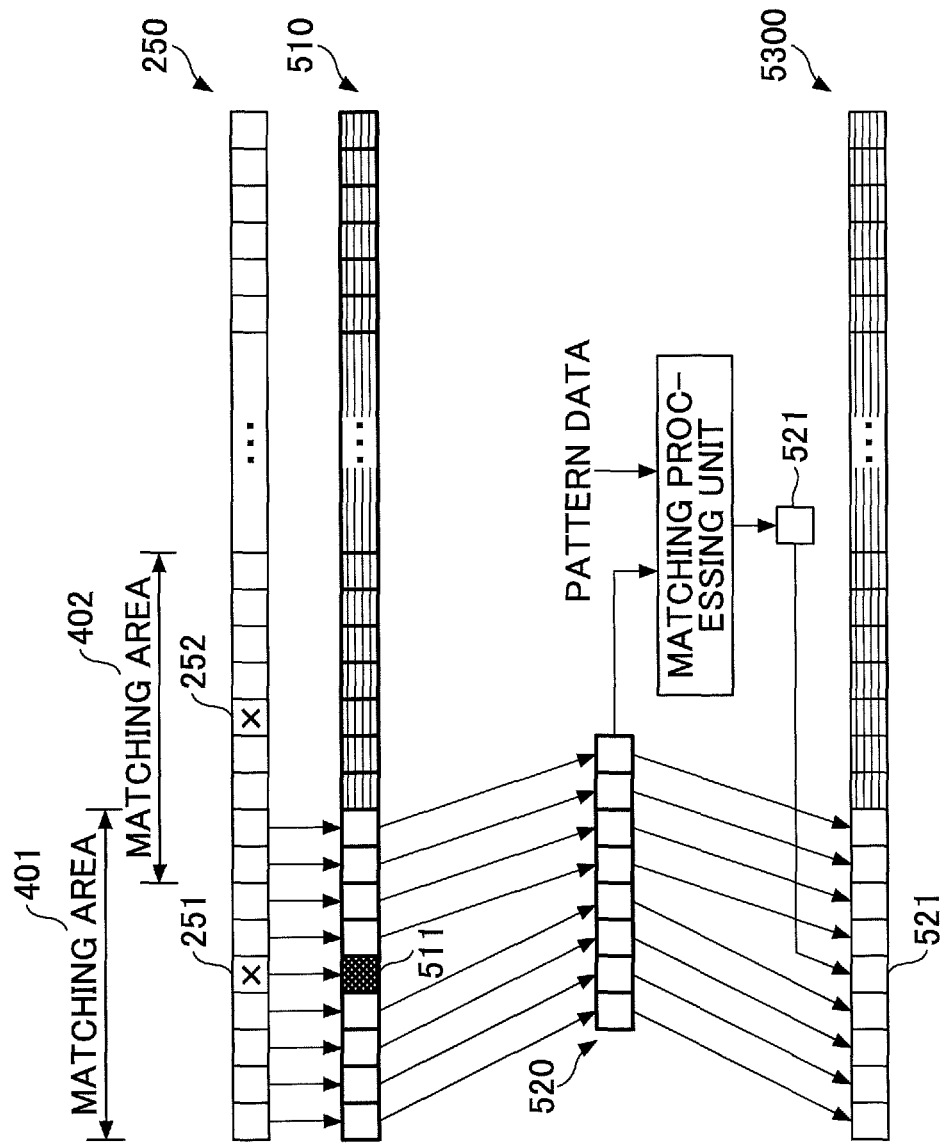
FIGS. 5A and 5B are diagrams illustrating an example of an interpolation process in the case where matching areas of adjacent missing pixels overlap each other, by using an image processing device according to the first embodiment of the present invention.
Figure 5B:
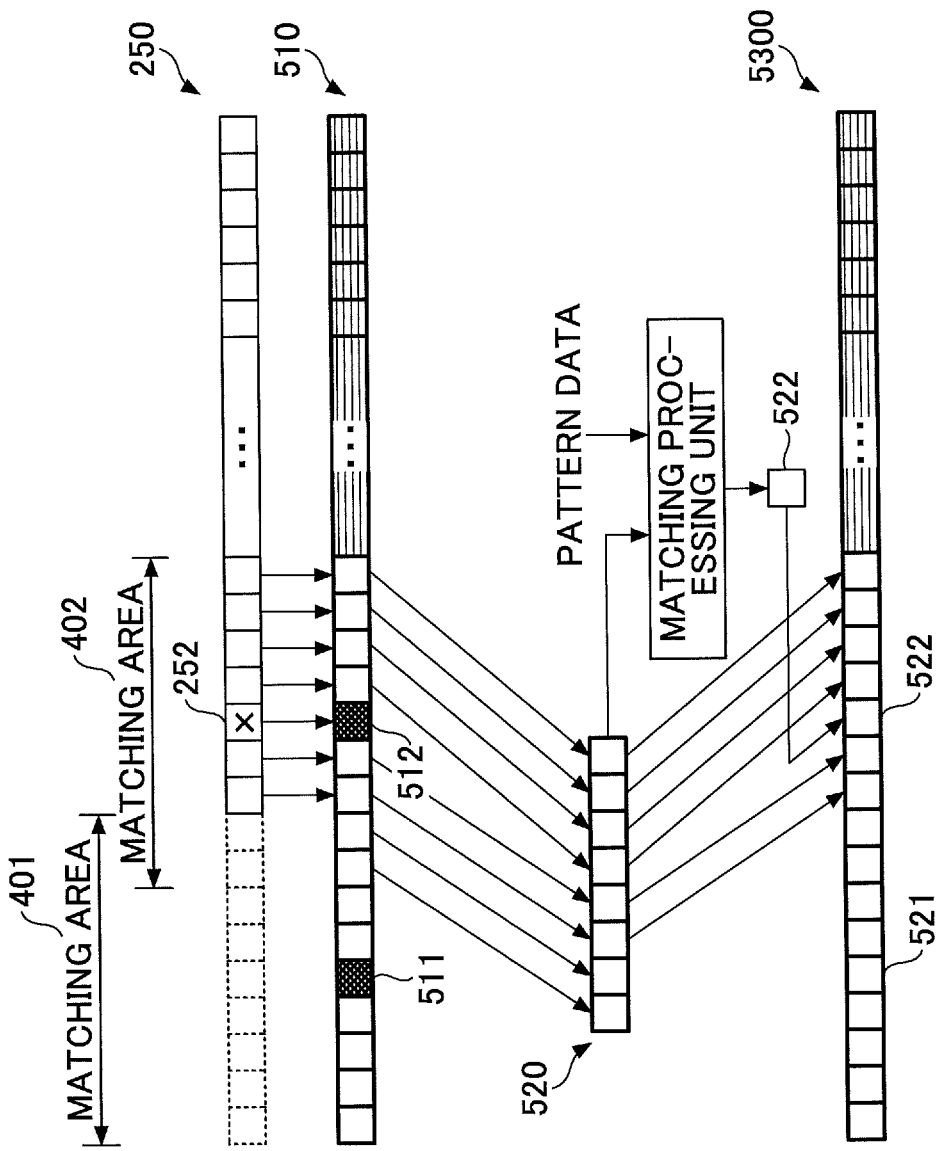

(2) Interpolation Process by Using Image Processing Device 114 According to Present Embodiment Next, an interpolation process in the case of using the image processing device 114 according to the present embodiment will be described. FIGS. 5A and 5B are diagrams illustrating an example of an interpolation process in the case where matching areas of adjacent missing pixels overlap each other, and illustrating a case where an interpolation process is executed by using the image processing device 114 according to the present embodiment.

As illustrated in FIG. 5A, in the case of the image processing device 114 according to the present embodiment, a line buffer 510 for storing the image data 250 of one line in the main scanning direction is included, and the pixel values of the pixels in the acquired image data 250 are sequentially stored in the line buffer 510.

Then, in the image processing device 114, the pixel values of the respective pixels included in the matching area 401 are read out from the line buffer 510 and stored in a matching process buffer 520. When the pixel values of the respective pixels included in the matching area 401 are read out from the line buffer 510 and stored in the matching process buffer 520, the matching processing unit performs matching processing. Specifically, the matching processing unit performs a matching process by using the pixel values of the pixels stored in the matching process buffer 520, based on previously prepared pattern data. Thus, the matching processing unit calculates a pixel value 521 of an interpolation pixel.

When the pixel value 521 of the interpolation pixel is calculated, the image processing device 114 inserts the pixel value 521 of the interpolation pixel at the position corresponding to a missing pixel 511, among the pixels stored in the matching process buffer 520. Then, the pixel value 521 of the interpolation pixel is output together with the pixel values of the respective pixels stored in the matching process buffer 520, as the pixel values of the respective pixels of image data 5300.

Upon completion of the matching process for the matching area 401, as illustrated in FIG. 5B, the image processing device 114 reads out the pixel values of the pixels included in the next matching area 402 from the line buffer 510, and stores the pixel values in the matching process buffer 520.

Here, in the case of the image processing device 114, the pixel values of the respective pixels of the image data 250 of one line in the main scanning direction can be stored in the line buffer 510.

Therefore, when the pixel values of the respective pixels included in the next matching area 402 are stored in the matching process buffer 520, the image processing device 114 accesses the leading address of the addresses corresponding to the matching area 402. Thus, in the image processing device 114, the pixel values of the pixels included in the matching area 402 can be sequentially read out from the line buffer 510.

When the pixel values of the respective pixels included in the matching area 402 are stored in the matching process buffer 520, the matching processing unit performs a matching process based on previously prepared pattern data. Accordingly, the matching processing unit calculates a pixel value 522 of an interpolation pixel.

When the pixel value 522 of the interpolation pixel is calculated, the image processing device 114 inserts the pixel value 522 of the interpolation pixel at the position corresponding to a missing pixel 512, among the pixels stored in the matching process buffer 520. Then, the pixel value 522 of the interpolation pixel is output together with the pixel values of the respective pixels stored in the matching process buffer 520, as the pixel values of the respective pixels of the image data 5300.

In this way, in the present embodiment, the line buffer 510 is arranged in the image processing device 114, and the acquired image data is stored. Thus, according to the image processing device 114, it becomes possible to read out the pixel values of the respective pixels included in the matching area from the line buffer 510 and store the pixel values in the matching process buffer 520.

Furthermore, in the present embodiment, at the time of reading out the pixel values from the line buffer 510, the addresses corresponding to the matching area are accessed (not the addresses corresponding to the acquisition order). Thus, according to the image processing device 114, regardless of the address at the time of completion of the matching process for the previous matching area 401, addresses corresponding to the current matching area 402 can be newly set and accessed in the line buffer 510.

As a result, according to the image processing device 114, pixel values can be stored in the matching process buffer 520 after rearranging the pixels in accordance with the overlapping of the matching areas.

FIGS. 6A and 6B are diagrams illustrating examples of pixels stored in the matching process buffers at respective timings. Among these figures, FIG. 6A illustrates pixels stored in the matching process buffer 410 of a general image processing device as a comparison example. On the other hand, FIG. 6B illustrates pixels stored in the matching process buffer 520 of the image processing device 114 according to the present embodiment. Note that he numbers of pixels are numbers assigned for the sake of convenience, and the same number indicates that the pixel value of the same pixel is stored.

As illustrated in FIG. 6A, in the case of a general image processing device, at a timing 611, the pixel values of pixels 1 to 9 are stored in the matching process buffer 410. Furthermore, at a timing 612, the pixel values of the pixels 10 to 16 are stored in the matching process buffer 410. That is, the respective pixels in the image data are stored in the matching process buffer 410 in the order of acquisition.

On the other hand, as illustrated in FIG. 6B, in the case of the image processing device 114 according to the present embodiment, at a timing 621, the pixel values of the pixels 1 to 9 are stored in the matching process buffer 520. Furthermore, at a timing 622, the pixel values of the pixels 8 to 16 are stored in the matching process buffer 520.

As described above, in the case of the image processing device 114 according to the present embodiment, pixel values can be stored in the matching process buffer 520 after rearranging the pixels in accordance with the overlapping of matching areas.

As a result, according to the image processing device 114, even when a matching area overlaps another matching area, it is possible to appropriately calculate the pixel value of the interpolation pixel, thereby avoiding the occurrence of missing pixels.

<4. Functional Configuration of Image Processing Device-First Embodiment>

Figure 7:
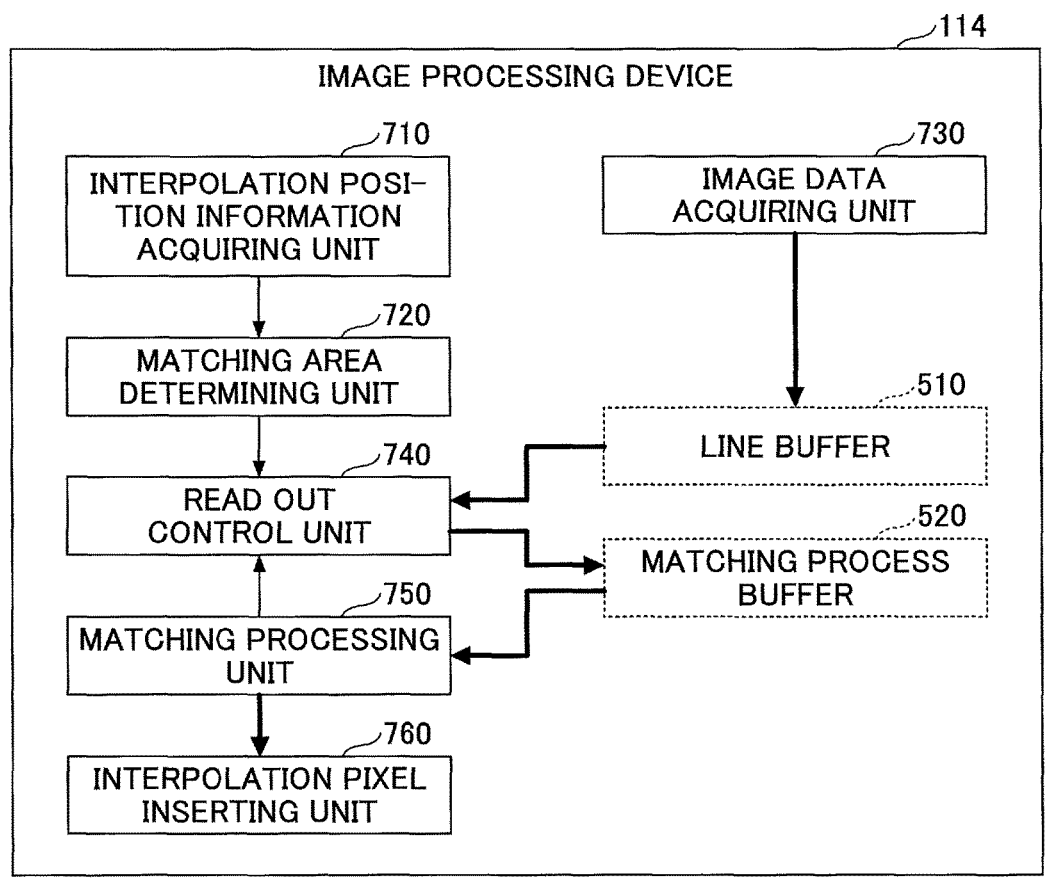
FIG. 7 is an example of a functional block diagram of the image processing device according to the first embodiment of the present invention.

Next, the functional configuration of the image processing device 114 will be described. FIG. 7 is an example of a functional block diagram of the image processing device 114. As illustrated in FIG. 7, the image processing device 114 includes an interpolation position information acquiring unit 710, a matching area determining unit 720, an image data acquiring unit 730, a read out control unit 740, a matching processing unit 750, and an interpolation pixel inserting unit 760.

The interpolation position information acquiring unit 710 recognizes, in advance, the element where an event that is the cause of the occurrence of a missing pixel is occurring, among the elements of the reading device 116, and acquires interpolation position information including information indicating the position of the element where the event is occurring. The interpolation position information acquiring unit 710 notifies the matching area determining unit 720 of the acquired interpolation position information.

The matching area determining unit 720 is an example of a definer, and determines a matching area based on the interpolation position information notified from the interpolation position information acquiring unit 710. When information indicating a plurality of positions is included in the interpolation position information, the matching area determining unit 720 determines a matching area for each piece of information indicating one of the positions. The matching area determining unit 720 notifies the read out control unit 740 of the determined matching area.

The image data acquiring unit 730 acquires image data generated based on signals detected by the respective elements of the reading device 116, and stores the image data in the line buffer 510.

The read out control unit 740 is an example of a read out control unit, and identifies a read out address (an address indicating a read out destination in the line buffer 510) corresponding to each pixel included in the matching area notified from the matching area determining unit 720. Furthermore, the read out control unit 740 sequentially accesses the line buffer 510 based on each identified read out address, and reads out the pixel value. Furthermore, the read out control unit 740 sequentially stores the pixel values read out from the line buffer 510, in the matching process buffer 520.

Note that upon receiving a notification of the completion of the matching process, which has been performed by using the pixel values of the respective pixels included in the previous (Nth) matching area, the read out control unit 740 reads out, from the line buffer 510, the pixel values of the respective pixels included in the current (N+1)th matching area.

Here, at the time point when the matching process is completed for the pixel values of the respective pixels included in the previous (Nth) matching area, the read out address is the address corresponding to the last pixel in the Nth matching area. Therefore, when reading out the pixel values of the respective pixels included in the (N+1)th matching area, the read out control unit 740 changes the read out address to the leading address of the addresses corresponding to the pixels included in the (N+1)th matching area.

The matching processing unit 750 is an example of a calculator. When all the pixel values of the pixels included in the matching area are stored in the matching process buffer 520, the matching processing unit 750 performs a matching process based on previously prepared pattern data, and calculates a pixel value of an interpolation pixel. Upon completion of the matching process, the matching processing unit 750 notifies the read out control unit 740 of the completion, and transmits the calculated pixel value of the interpolation pixel to the interpolation'pixel inserting unit 760.

The interpolation pixel inserting unit 760 inserts the pixel value of the interpolation pixel, which is transmitted from the matching processing unit 750, at the position corresponding to the missing pixel, among the pixels stored in the matching process buffer 520.

<5. Flow of Interpolation Process-First Embodiment>

Next, the flow of the interpolation process by the image processing device 114 will be described. FIG. 8 is a flowchart illustrating the flow of the interpolation process by the image processing device 114. When scanning by the reading device 116 is started, the image processing device 114 starts the flow of the flowchart illustrated in FIG. 8. Here, the flow of the interpolation process for image data of one line in the main scanning direction will be described.

In step S801, the interpolation position information acquiring unit 710 acquires the interpolation position information and notifies the matching area determining unit 720 of the interpolation position information.

In step S802, the matching area determining unit 720 determines the matching area based on the interpolation position information. Furthermore, the matching area determining unit 720 inputs 1 to a matching area counter N that counts the matching areas (an integer of one or more can be input to N).

In step S803, the image data acquiring unit 730 acquires the image data generated based on the signals detected by the respective elements of the reading device 116, and starts a process of storing the image data in the line buffer 510. Thereafter, the process is continued until the image data of one line in the main scanning direction is acquired, and storage of the image data in the line buffer 510 is completed.

In step S804, the read out control unit 740 identifies the addresses in the line buffer 510 corresponding to the respective pixels included in the Nth matching area, among the matching areas determined by the matching area determining unit 720. Furthermore, the read out control unit 740 sets the leading address of the identified addresses, as a read out address.

In step S805, the read out control unit 740 reads out a pixel value by accessing the line buffer 510 based on the read out address, and stores the read pixel value in the matching process buffer 520.

In step S806, the read out control unit 740 determines whether the pixel values of all of the pixels included in the Nth matching area are stored in the matching process buffer 520. When the read out control unit 740 determines in step S806 that there is a pixel that is not stored in the matching process buffer 520 (NO in step S806), the process proceeds to step S807.

In step S807, the read out control unit 740 increments the read out address and returns to step S805.

Conversely, when the read out control unit 740 determines in step S806 that the pixel values of all of the pixels included in the Nth matching area are stored in the matching process buffer 520 (YES in step S806), the process proceeds to step S808.

In step S808, the matching processing unit 750 performs a matching process based on previously prepared pattern data, by using the pixel values of the pixels stored in the matching process buffer 520, and calculates the pixel value of the interpolation pixel.

In step S809, the interpolation pixel inserting unit 760 inserts the pixel value of the interpolation pixel at the position corresponding to the missing pixel, among the respective pixels stored in the matching process buffer 520.

In step S810, the read out control unit 740 determines whether the process has been executed for all of the matching areas. In step S810, when it is determined that there is a matching area for which the process has not been executed (NO in step S810), the process proceeds to step S811.

In step S811, the read out control unit 740 increments the matching area counter N and returns to step S804.

Conversely, when it is determined in step S810 that the process has been executed for all of the matching areas (YES in step S810), the interpolation process is ended.

<6. Overview-First Embodiment>

As is apparent from the above description, the image processing device 114 according to the present embodiment performs the following contents.

The image processing device 114 acquires image data of one line in the main scanning direction, generated based on signals of the elements of the reading device, and stores the image data in the line buffer.

The image processing device 114 reads out the pixel values of the respective pixels included in the matching area from the line buffer, and stores the pixel values in the matching process buffer.

The image processing device 114 performs a matching process by using the pixel values of the respective pixels included in the matching area stored in the matching process buffer, and calculates the pixel value of the interpolation pixel.

When the matching process is completed, the image processing device 114 sequentially reads out, from the line buffer, the pixel values of the respective pixels included in the next matching area, by accessing the leading address of the addresses corresponding to the respective pixels included in the next matching area, and stores the pixel values in the matching process buffer.

Thus, according to the image processing device 114, even when the matching area overlaps another matching area, it is possible to store all the pixel values of the respective pixels included in the matching area, in the matching process buffer.

As a result, according to the image processing device 114, even when the matching area overlaps another matching area, it is possible to appropriately perform a matching process with respect to a missing pixel and to calculate the pixel value of the interpolation pixel.

Second Embodiment

In the first embodiment, it has been described that a matching area is determined for image data of one line in the main scanning direction, a matching process is performed, and a pixel value of an interpolation pixel is calculated. However, the method of calculating the pixel value of the interpolation pixel is not limited as such, and a matching area may be determined for image data of a plurality of lines to perform the matching process.

FIGS. 9A and 9B are diagrams illustrating examples of a matching process. Among these figures, FIG. 9A illustrates a case where a matching process is performed by determining a matching area for image data of one line in the main scanning direction as a comparison example. Note that in the case where a matching process is performed by determining a matching area for image data of one line in the main scanning direction, for example, the absolute difference value calculated by the following formula can be used as the matching degree.

$$R_{SAD} = \Sigma |I(i) - T(i)| \quad \text{(Formula 1)}$$

On the other hand, FIG. 9B illustrates a case where a matching process is performed by determining a matching area for image data of a plurality of lines (three lines). In the case where a matching area is determined for image data of a plurality of lines and a matching process is performed, for example, the absolute difference value calculated by the following formula can be used as the matching degree.

$$R_{SAD} = \Sigma\Sigma |I(i,j) - T(i,j)| \quad \text{(Formula 2)}$$

In this way, the matching area determining unit 720 can determine not only a matching area in the main scanning direction, but also a matching area in both the main scanning direction and the sub scanning direction.

Other Embodiments

In the first embodiment described above, the image processing device 114 determines a matching area formed of four preceding pixels and four succeeding pixels centered on the missing pixel; however, the method of determining the matching area is not limited as such. A predetermined number of pixels that is greater than or equal to five pixels before and after the missing pixel, may be determined as the matching area. Furthermore, the matching area may be determined by allocating different numbers of pixels before and after the missing pixel.

Furthermore, in the first embodiment, a case where the matching areas overlap as a result of extending the matching areas, has been described; however, by shortening the length of each of the plurality of sensor chips 210_1 to 210_n, for example, overlapping may occur. In this case also, according to the image processing device 114, the same interpolation process as in the first embodiment can be applied.

Furthermore, in each of the above-described embodiments, a case where the interpolation process (FIG. 8) is executed by using an exclusive-use integrated circuit has been described. However, a computer formed by the CPU, the ROM, and the RAM may execute the image processing program to execute the interpolation process (FIG. 8).

Third Embodiment

When missing pixels are generated due to the occurrence reason described with reference to FIG. 2B, a case where the occurrence interval of missing pixels is short and a case where the occurrence interval of the missing pixels are long, are mixed. Therefore, during the interpolation process, in the image processing device 114, a case where the pixel area (referred to as "matching area") used for pattern matching around the missing pixel, overlaps a matching area of another missing pixel, and a case where the matching area does not overlap a matching area of another missing pixel, are mixed.

Therefore, in the following, a description is given of an interpolation process by the image processing device 114, in which a case where the matching area overlaps another matching area and a case where the matching area does not overlap another matching area, are mixed. In the description, as a comparative example, an interpolation process in the case of using a general image processing device will be described first (see <1.1> below). Subsequently, an interpolation process in the case of using the image processing device 114 will be described (see <1.2> below).

<1. Interpolation Process-Third Embodiment>
<1.1 Interpolation Process (General Image Processing Device)-Third Embodiment>

First, an interpolation process in the case of using a general image processing device will be described. FIGS. 10A to 11B are diagrams illustrating examples of an interpolation process in the case of using a general image processing device. Specifically, a description is given of an interpolation process in which a case where a matching area of a missing pixel and a matching area of an adjacent missing pixel overlap, and a case where a matching area of a missing pixel and a matching area of an adjacent missing pixel do not overlap, are mixed. Note that in executing the interpolation process, it is assumed that in a general image processing device, it is known in advance that an event, which is a cause of the occurrence of a missing pixel, has occurred, and the matching area has been determined.

Figure 10A:
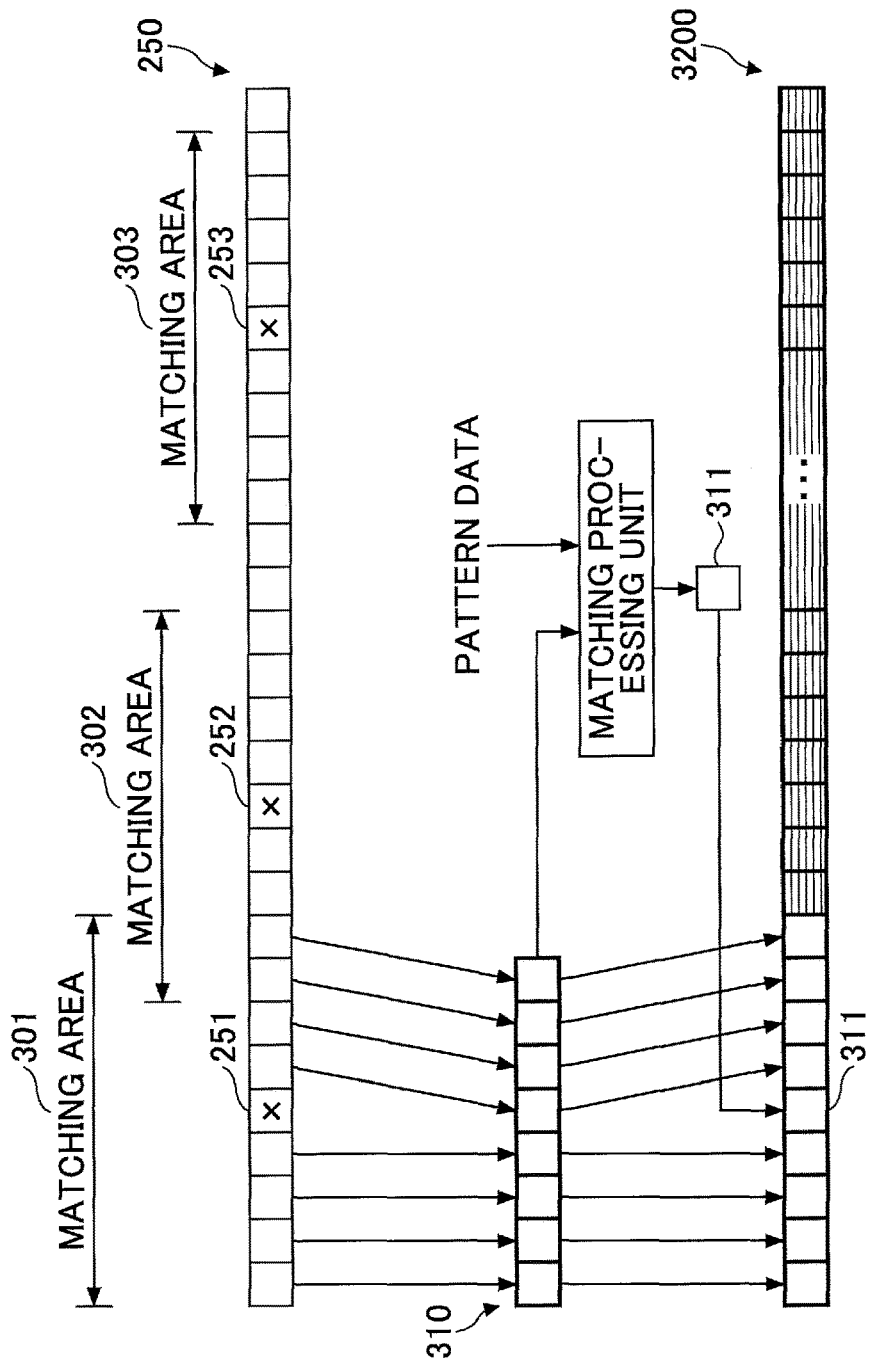
FIGS. 10A and 10B are diagrams illustrating an example of an interpolation process in the case of using a general image processing device.

Upon acquiring the image data 250 of one line in the main scanning direction, a general image processing device determines whether the pixels that are the processing targets are included in the matching area. In the example of FIG. 10A, since the pixels that are the processing targets are included in the matching area 301, the general image processing device stores the pixel values of the respective pixels that are the processing targets, in the matching process buffer 310.

When all of the pixel values of the respective pixels included in the matching area 301 are stored in the matching process buffer 310, the matching processing unit performs a matching process based on previously prepared pattern data. Accordingly, the matching processing unit calculates the pixel value 311 of the interpolation pixel.

When the pixel value 311 of the interpolation pixel is calculated, the general image processing device inserts the pixel value 311 of the interpolation pixel at the position corresponding to the missing pixel, among the respective pixels stored in the matching process buffer 310. Then, the pixel value 311 is stored, in an output buffer 3200, together with the pixel values of the respective pixels stored in the matching process buffer 310.

Figure 10B:
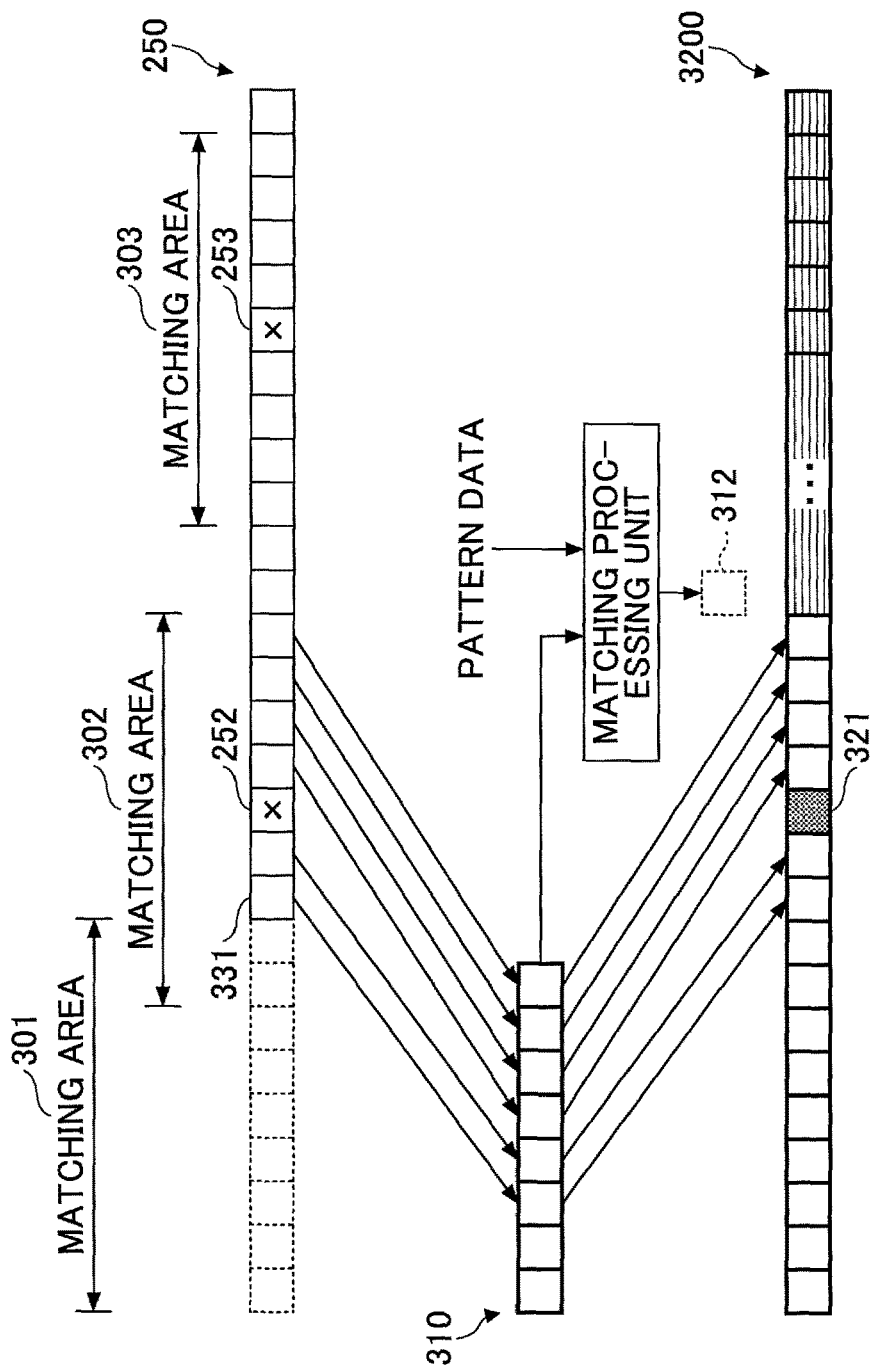

When the matching process for the matching area 301 is completed, as illustrated in FIG. 10B, in a general image processing device, a pixel 331 next to the processed pixels in the image data 250, is processed as a pixel that is the processing target. Specifically, it is determined whether the pixel that is the processing target is included in the matching area. When it is determined that the pixel is included in the matching area, the pixel value of the pixel is stored in the matching process buffer 310.

Therefore, in the case of a general image processing device, the pixel values starting from the pixel value of the pixel 331, are stored in the matching process buffer 310. That is, in the case of a general image processing device, it is not possible to store, in the matching process buffer 310, all of the pixel values of the respective pixels included in the matching area 302. In the example of FIG. 10B, pixel values of two pixels (pixel values of pixels included in the area overlapping the matching area 301) are not stored in the matching process buffer 310. As a result, the matching processing unit cannot perform the matching process by using all of the pixel values of the respective pixels included in the matching area 302, and the pixel value 312 of the interpolation pixel cannot be appropriately calculated.

As described above, in the case of a general image processing device, when the matching area of a missing pixel overlaps another matching area of an adjacent missing pixel, the pixel value of the interpolation pixel cannot be appropriately calculated and a missing pixel 321 will be stored in the output buffer 3200.

However, even in the case of a general image processing device, when the matching area does not overlap another matching area (in the case where there are pixels that are not included in any matching area, between the matching area and another matching area), it is possible to appropriately calculate the pixel value of the interpolation pixel.

Figure 11A:
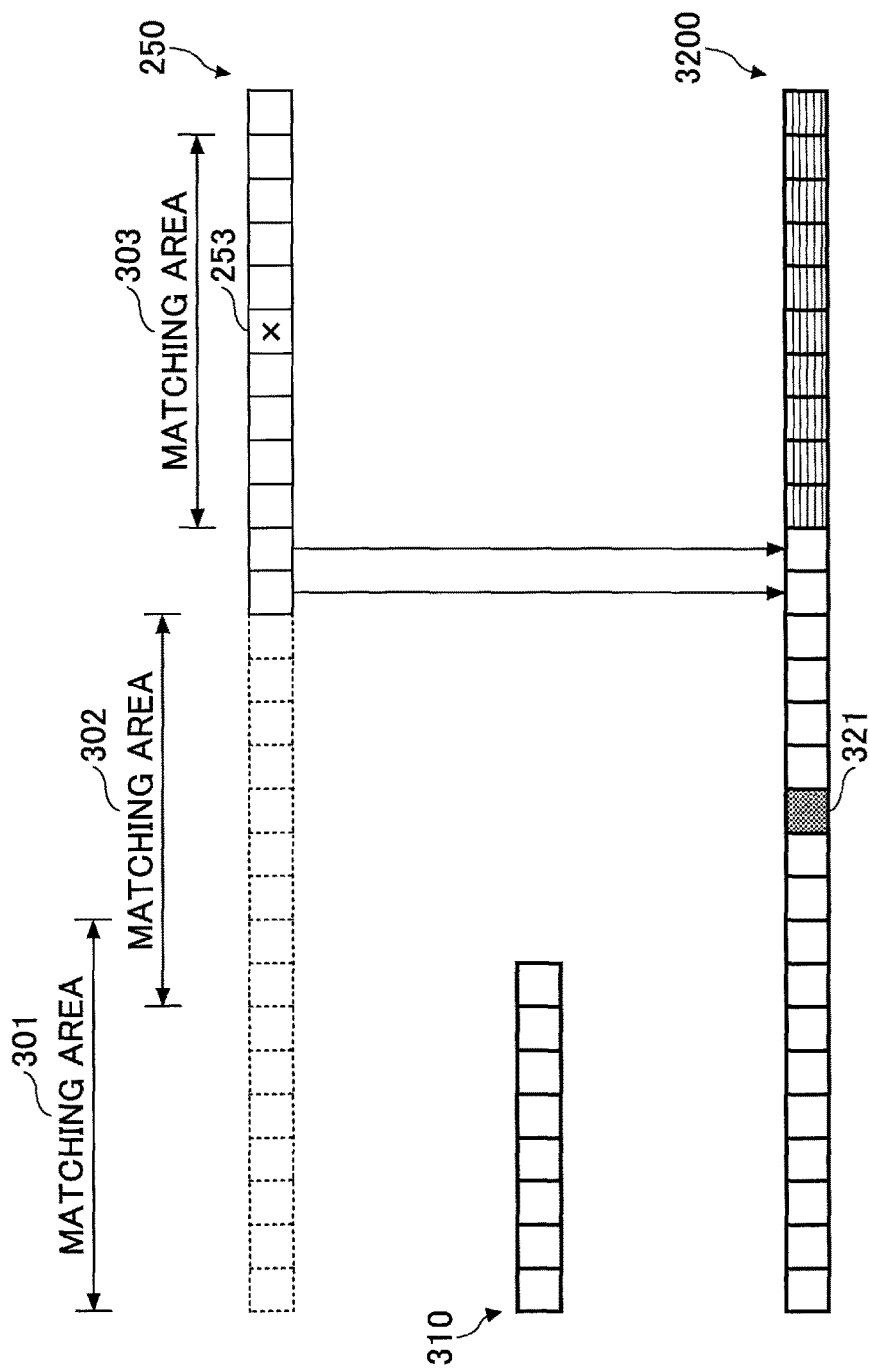
FIGS. 11A and 11B are diagrams illustrating an example of an interpolation process in the case of using a general image processing device.

FIG. 11A illustrates a process by a general image processing device when the pixel that is the processing target is not included in any matching area. In the case where the pixel that is the processing target is not included in any of the matching areas, the general image processing device stores the pixel value of the pixel that is the processing target in the output buffer 3200.

Figure 11B:
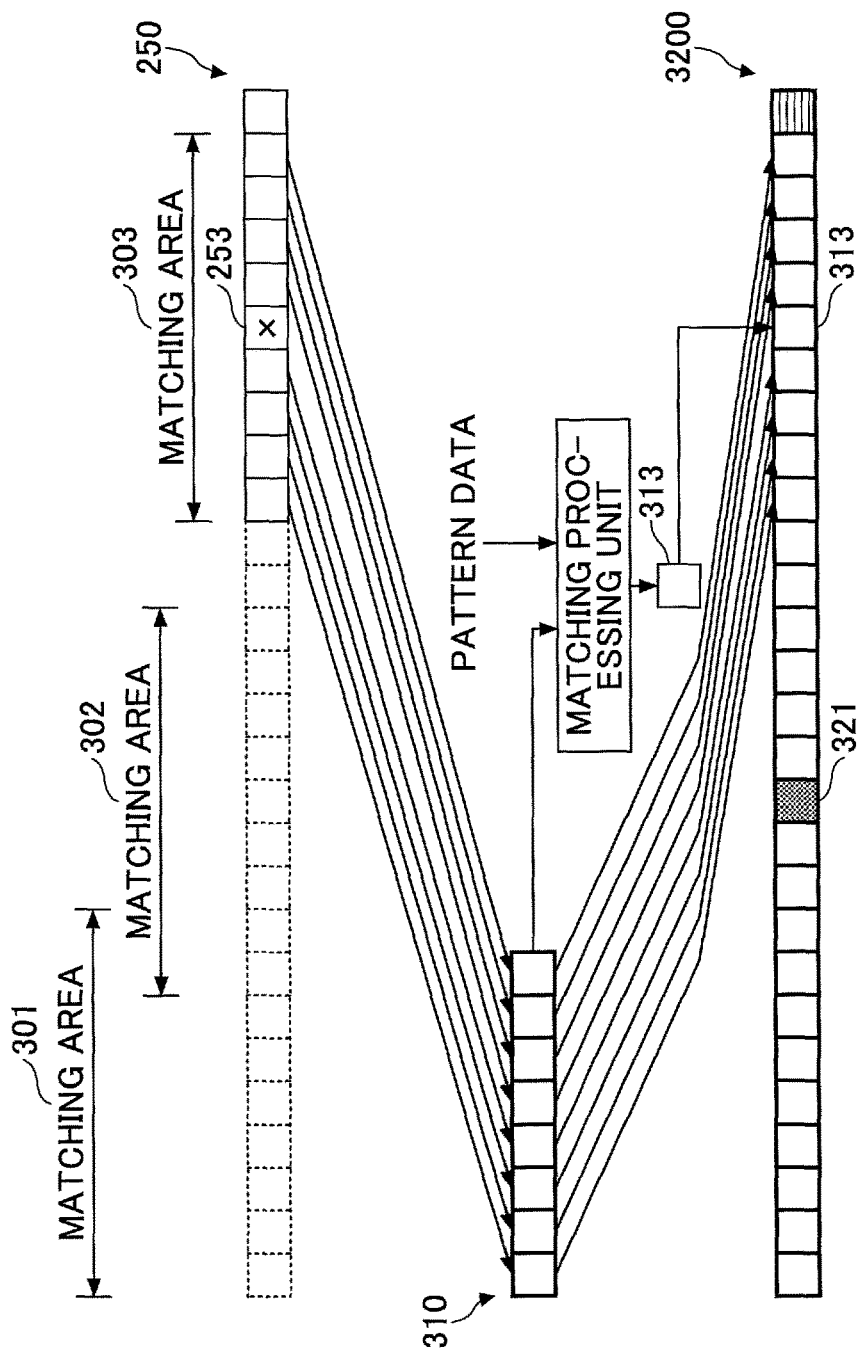

Furthermore, FIG. 11B illustrates a process by a general image processing device when the pixel that is the processing target is included in a matching area 303 (a matching area that is not overlapping another matching area). When a pixel that is the processing target is included in the matching area 303 (a matching area that is not overlapping another matching area), a general image processing device stores the pixel value of the pixel that is the processing target in the matching process buffer 310.

When all the pixel values of the pixels included in the matching area 303 are stored in the matching process buffer 310, the matching processing unit performs the matching process based on previously prepared pattern data. Accordingly, the matching processing unit calculates the pixel value 313 of the interpolation pixel.

When the pixel value 313 of the interpolation pixel is calculated, in the general image processing device, the pixel value 313 of the interpolation pixel is inserted at the position corresponding to the missing pixel, among the respective pixels stored in the matching process buffer 310. Then, the pixel value 313 is stored in the output buffer 3200 together with the pixel values of the respective pixels stored in the matching process buffer 310.

As described above, in the case of a general image processing device, when a matching area of a missing pixel does not overlap another matching area of an adjacent missing pixel, the pixel value of the interpolation pixel can be appropriately calculated.

<1.2 Interpolation Process Using Image Processing Device According to Present Embodiment-Third Embodiment>

Next, an interpolation process in the case of using the image processing device 114 according to the present embodiment will be described. In the image processing device 114 according to the present embodiment, an interpolation process is performed so that a pixel value of an interpolation pixel can be appropriately calculated, both in a case where the matching area overlaps another matching area and in the case where the matching area does not overlap another matching area. FIGS. 12A to 13B are diagrams illustrating an example of an interpolation process in the case of using the image processing device according to the third embodiment, in which a case where a matching area of a missing pixel overlaps another matching area of an adjacent missing pixel, and a case where a matching area of a missing pixel does not overlap another matching area of an adjacent missing pixel, are mixed. Note that in executing the interpolation process, it is assumed that in the image processing device 114, it is known in advance that an event, which is a cause of the occurrence of a missing pixel, has occurred, and the matching area is determined.

Figure 12A:
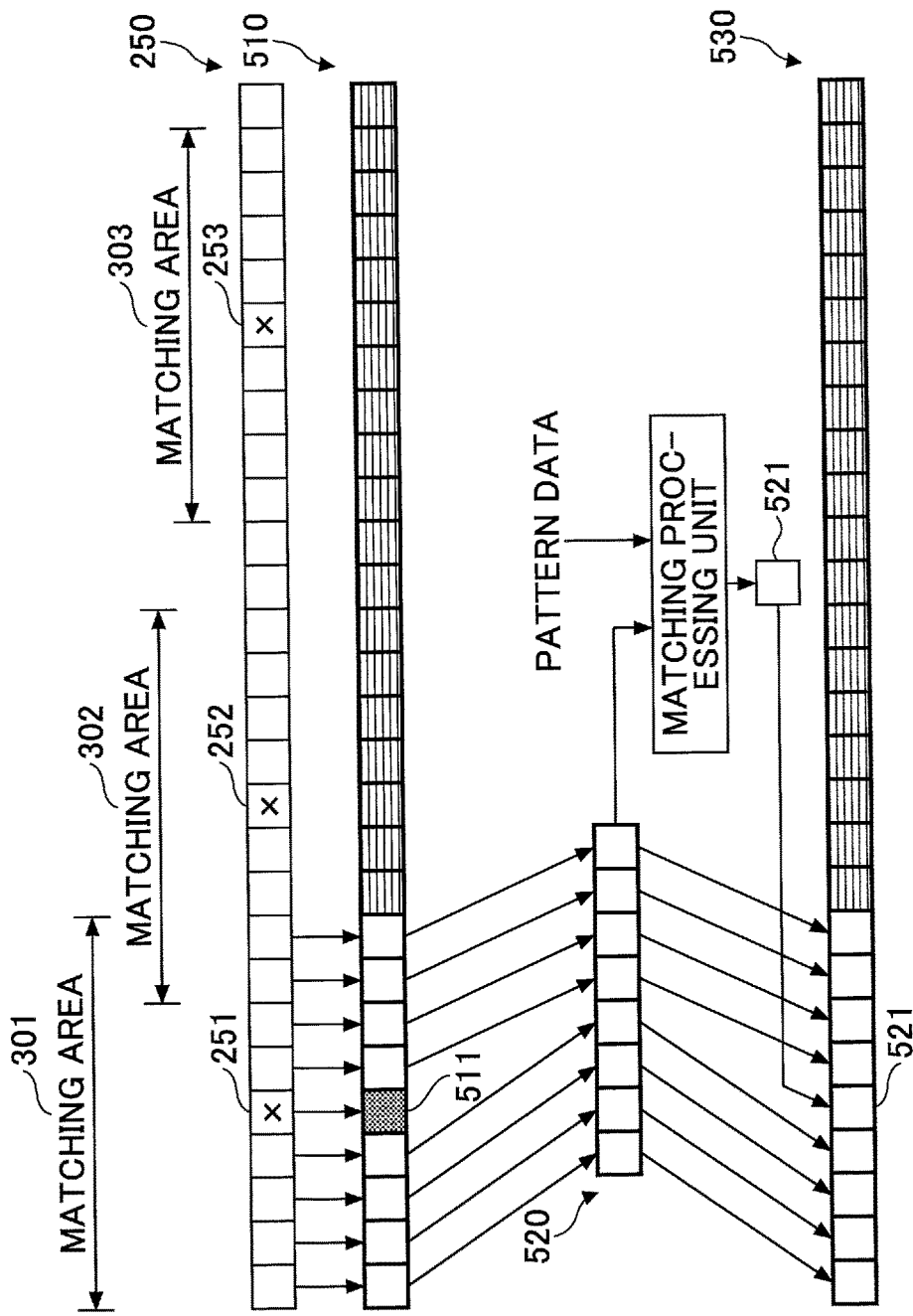
FIGS. 12A and 12B are diagrams illustrating an example of an interpolation process in the case of using the image processing device according to a third embodiment of the present invention.

As illustrated in FIG. 12A, in the case of the image processing device 114 according to the present embodiment, the line buffer 510 for storing the image data 250 for one line in the main scanning direction is included, and the pixel values of the respective pixels in the acquired image data 250 are sequentially stored in the line buffer 510.

Furthermore, the image processing device 114 according to the present embodiment determines whether the pixel that is the processing target among the pixels of the stored image data 250, is included in the matching area. In the example of FIG. 12A, since the pixels that are the processing targets are included in the matching area 301, the image processing device 114 reads out the pixel values of the pixels that are the processing targets from the line buffer 510, and stores the pixel values in the matching process buffer 520.

When all of the pixel values of the pixels included in the matching area 301 are read out from the line buffer 510 and stored in the matching process buffer 520, the matching processing unit performs a matching process based on previously prepared pattern data. Thus, the matching processing unit calculates the pixel value 521 of the interpolation pixel.

Upon calculating the pixel value 521 of the interpolation pixel, the image processing device 114 inserts the pixel value 521 of the interpolation pixel at the position corresponding to the missing pixel 511 among the pixels stored in the matching process buffer 520. Then, the pixel value 521 is stored in an output buffer 530 together with the pixel values of the respective pixels stored in the matching process buffer 520.

Figure 12B:
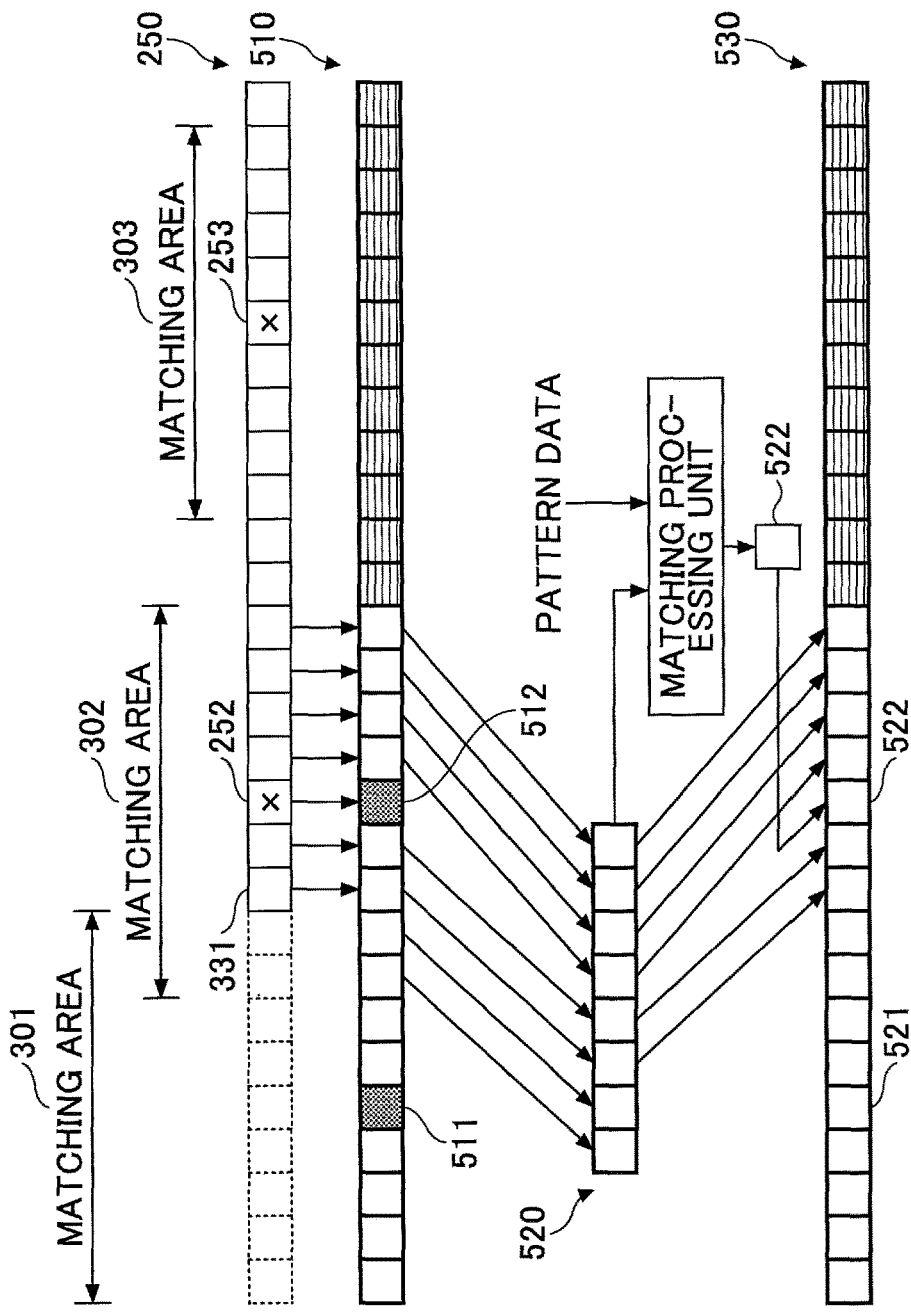

Upon completion of the matching process for the matching area 301, the image processing device 114 determines whether the pixel 331 next to the processed pixels is included in the matching area. In the example of FIG. 12B, since the pixel 331 is included in the matching area 302, the image processing device 114 reads out the pixel values of the respective pixels included in the matching area 302 from the line buffer 510, and stores the pixel values in the matching process buffer 520.

Here, in the case of the image processing device 114, the pixel values of the respective pixels of the image data 250 are stored in the line buffer 510. Therefore, the image processing device 114 can go back to processed pixels and read out the pixel values of the respective pixels included in the matching area 302 from the line buffer 510.

Specifically, the image processing device 114 accesses the leading address of the addresses corresponding to the respective pixels included in the matching area 302 in the line buffer 510. Accordingly, the image processing device 114 can sequentially read out pixel values of pixels included in the matching area 302 from the line buffer 510.

When all of the pixel values of the respective pixels included in the matching area 302 are stored in the matching process buffer 520, the matching processing unit performs a matching process based on previously prepared pattern data. Accordingly, the matching processing unit calculates the pixel value 522 of the interpolation pixel.

When the pixel value 522 of the interpolation pixel is calculated, the image processing device 114 inserts the pixel value 522 of the interpolation pixel at the position corresponding to the missing pixel 512 among the respective pixels stored in the matching process buffer 520. Then, the pixel value 522 is stored in the output buffer 530 together with the pixel values of the respective pixels stored in the matching process buffer 520. However, the first two pixels among the pixels stored in the matching process buffer 520 have already been stored in the output buffer 530 together with the pixel value 521 of the interpolation pixel. Therefore, here, the pixel values of the pixels excluding the pixels in the area overlapping the matching area 301, among the pixels stored in the matching process buffer 520, are stored in the output buffer 530 together with the pixel value 522 of the interpolation pixel.

As described above, in the present embodiment, the line buffer 510 is included in the image processing device 114, and the acquired image data is sequentially stored in the line buffer 510. Thus, according to the image processing device 114, it is possible to read out the pixel values of the respective pixels included in the matching area from the line buffer 510, and store the pixel values in the matching process buffer 520.

Furthermore, in the present embodiment, at the time of reading out the pixel values from the line buffer 510, addresses corresponding to the respective pixels included in the matching area, are accessed. That is, the image processing device 114 accesses the line buffer 510 according to the addresses corresponding to the respective pixels included in the (N+1)th matching area, regardless of the address at the time when the matching process is completed for the Nth matching area.

Thus, according to the image processing device 114, it is possible to read all of the pixel values of the respective pixels included in the matching area, and store the pixel values in the matching process buffer 520, even when the matching areas overlap, and therefore it is possible to appropriately calculate the pixel value.

Note that in the image processing device 114 according to the present embodiment, even when a matching area of a missing pixel does not overlap another matching area of an adjacent missing pixel, by performing an interpolation process similar to that of the general image processing device, it is possible to appropriately calculate the pixel value of the interpolation pixel.

Figure 13A:
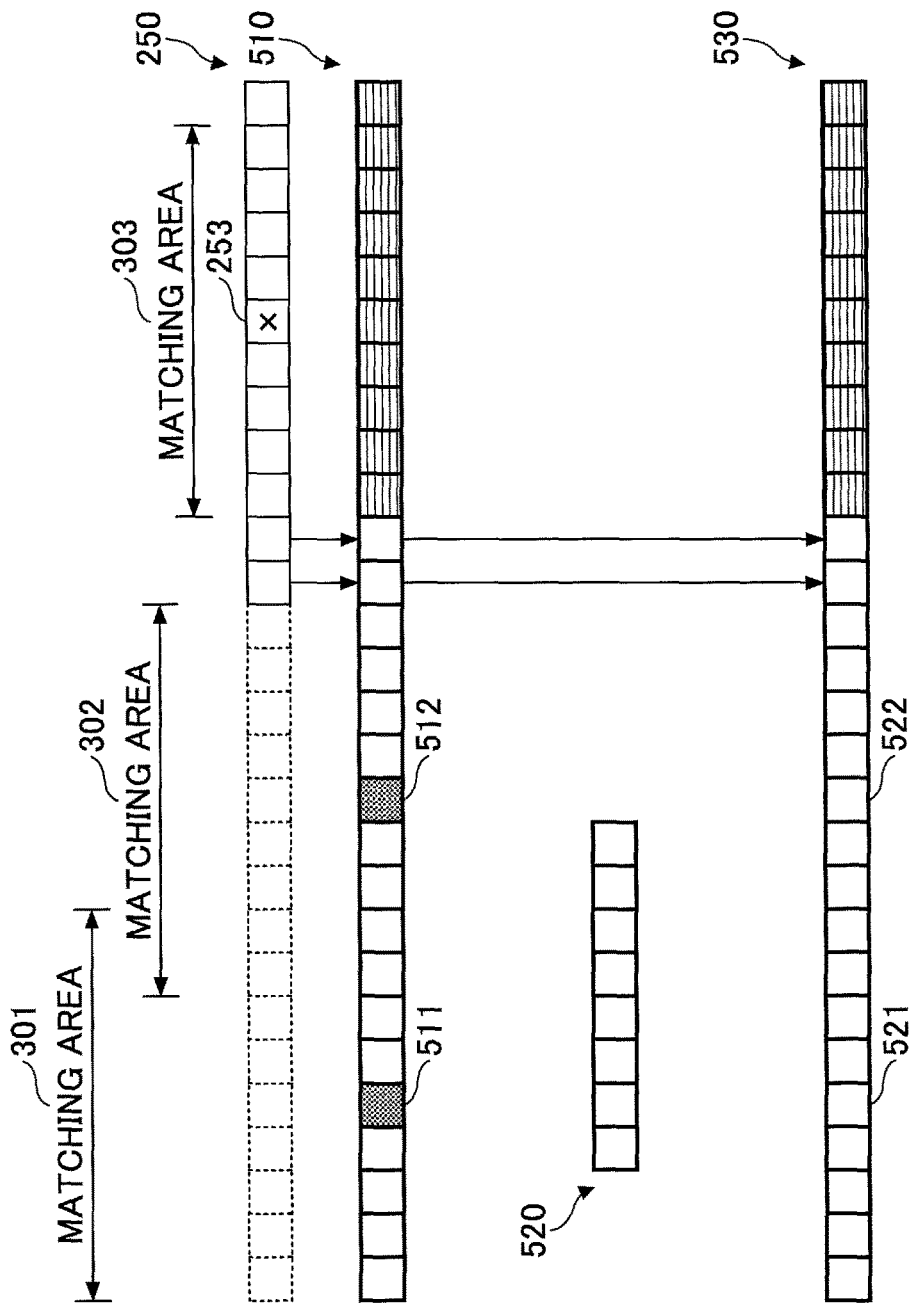
FIGS. 13A and 13B are diagrams illustrating an example of an interpolation process in the case of using the image processing device according to a third embodiment of the present invention.

FIG. 13A illustrates a process by the image processing device 114 when the pixel that is the processing target is not included in any matching area. When the pixel that is the processing target is not included in any matching area, the image processing device 114 reads out the pixel value of the pixel that is the processing target from the line buffer 510 and stores the pixel value in the output buffer 530.

Figure 13B:
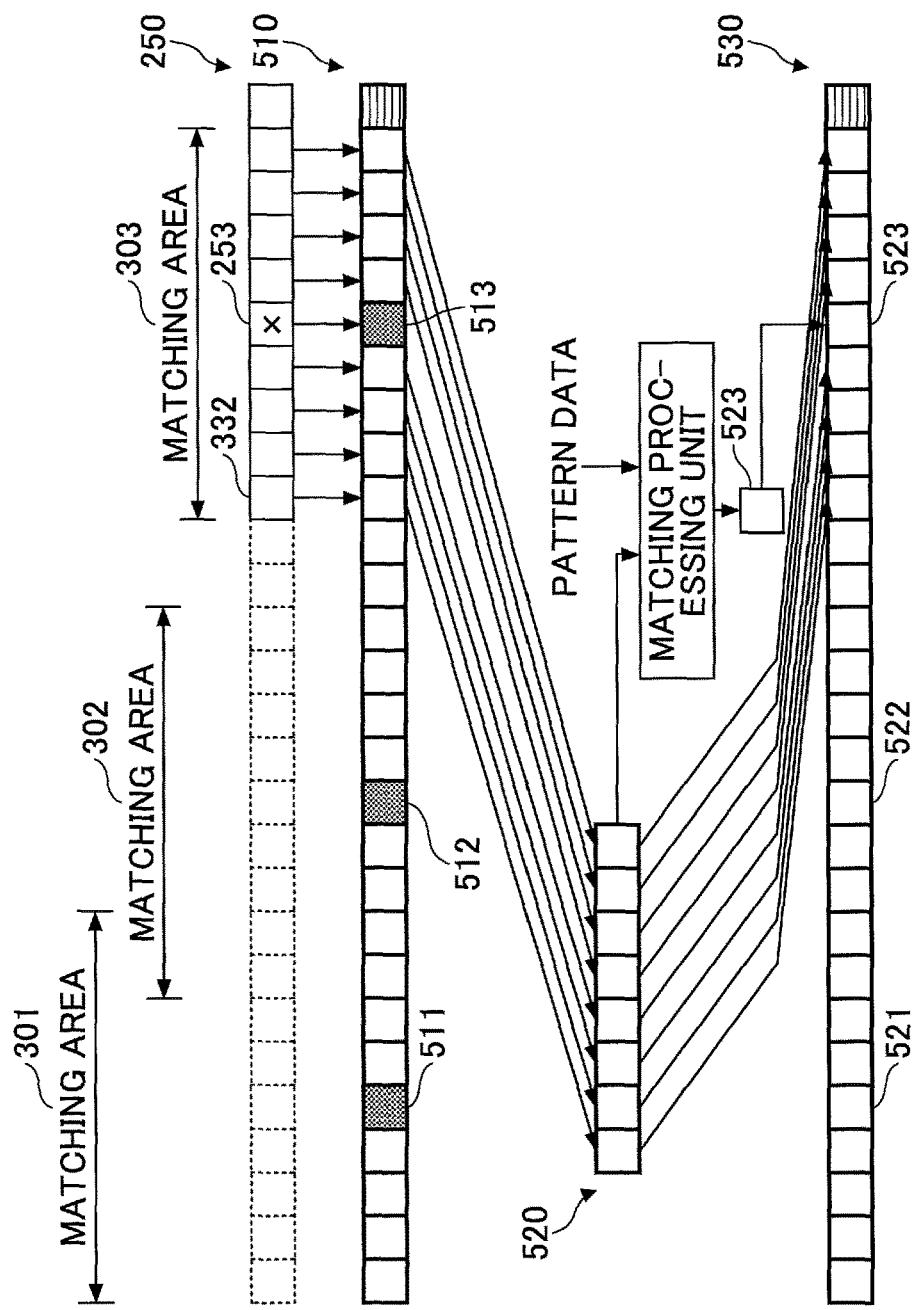

FIG. 13B illustrates a process by the image processing device 114 when the pixel that is the processing target is included in the matching area 303 (a matching area that is not overlapping another matching area). When a pixel 332 to be processed next is included in the matching area 303, the image processing device 114 reads out the pixel values of the respective pixels included in the matching area 303 from the line buffer 510, and stores the pixel values in the matching process buffer 520.

More specifically, the image processing device 114 accesses the leading address (here, the address corresponding to the pixel 332) of the addresses corresponding to the respective pixels included in the matching area 303 in the line buffer 510. Accordingly, the image processing device 114 can sequentially read out the pixel values of the respective pixels included in the matching area 303 from the line buffer 510.

When all of the pixel values of the respective pixels included in the matching area 303 are stored in the matching process buffer 520, the matching processing unit performs a matching process based on previously prepared pattern data. Accordingly, the matching processing unit calculates a pixel value 523 of the interpolation pixel.

Upon calculating the pixel value 523 of the interpolation pixel, the image processing device 114 according to the present embodiment inserts the pixel value 523 of the interpolation pixel at the position corresponding to the missing pixel among the respective pixels stored in the matching process buffer 520. Then, the pixel value 523 is stored in the output buffer 530 together with the pixel values of the respective pixels stored in the matching process buffer 520.

Thus, in the image processing device according to the present embodiment, it is possible to appropriately calculate the pixel value of the interpolation pixel, even when a matching area of a missing pixel does not overlap another matching area of an adjacent missing pixel.

In this way, in the image processing device 114, even when the matching area overlaps another matching area or does not overlap another matching area, the image processing device 114 implements control to read out all of the pixel values of the respective pixels included in the matching area. Then, when storing the pixel values in the output buffer, the image processing device 114 adjusts the pixels that have been read out in duplication.

In other words, in a case where the matching areas overlap, the image processing device 114 stores the pixel values upon rearranging the pixel values in accordance with the overlapping of the matching areas, in the matching process buffer 520. Then, when storing the stored pixel values in the output buffer 530, the image processing device 114 implements output restriction in accordance with the overlapping of the matching areas.

Furthermore, in the image processing device 114, when the matching areas do not overlap, pixel values are stored in the matching process buffer 520 without being rearranged. Then, when storing the stored pixel values in the output buffer 530, the image processing device 114 outputs the pixel values without implementing output restriction.

FIG. 14 is a diagram illustrating an example of pixels stored in the matching process buffer and an output control signal for restricting output to the output buffer, at respective timings. Note that the numbers of pixels are numbers assigned for the sake of convenience, and the same number indicates that the pixel value of the same pixel is stored.

As illustrated in the top stage of FIG. 14, at a timing 701, the pixel values of the pixels 1 to 9 are stored in the matching process buffer 520. Furthermore, at a timing 702, the pixel values of pixels 8 to 16 are stored in the matching process buffer 520. The pixels stored at the timing 702 are pixels included in the matching area overlapping another matching area. Therefore, in the matching process buffer 520, pixel values of pixels, which are rearranged in accordance with the overlapping of the matching areas, are stored. Furthermore, as illustrated in the bottom stage in FIG. 14, the stored pixel values are stored in the output buffer 530 under the output restriction (see reference numeral 711) according in accordance with the overlapping of the matching areas.

On the other hand, as illustrated in the top stage of FIG. 14, at a timing 703, pixels 19 to 27 are stored in the matching process buffer 520. The pixels stored at the timing 703 are pixels included in a matching area that does not overlap another matching area. Therefore, the pixel values are stored in the matching process buffer 520 without rearranging the pixel values. Furthermore, as illustrated in the bottom stage of FIG. 14, the stored pixel values are stored in the output buffer 530 without any output restriction (refer to reference numeral 712).

<2. Functional Configuration of Image Processing Device-Third Embodiment>

Figure 15:
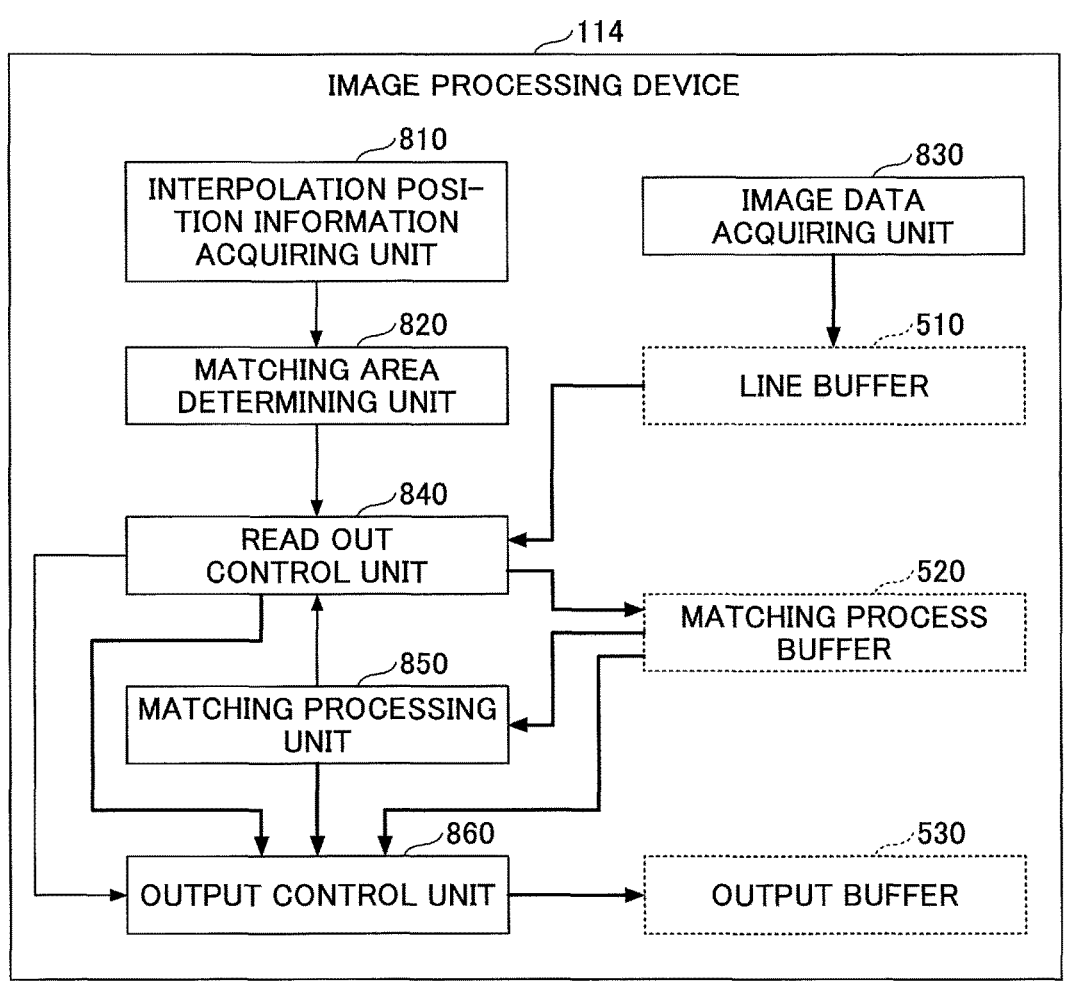
FIG. 15 is an example of a functional block diagram of the image processing device according to the third embodiment of the present invention.

Next, the functional configuration of the image processing device 114 will be described. FIG. 15 is an example of a functional block diagram of the image processing device 114. As illustrated in FIG. 15, the image processing device 114 includes an interpolation position information acquiring unit 810, a matching area determining unit 820, an image data acquiring unit 830, a read out control unit 840, a matching processing unit 850, and an output control unit 860.

The interpolation position information acquiring unit 810 recognizes, in advance, an element where an event that is the cause of the occurrence of a missing pixel is occurring, among the elements of the reading device 116, and acquires interpolation position information including information indicating the position of the element where the event is occurring. The interpolation position information acquiring unit 810 notifies the matching area determining unit 820 of the acquired interpolation position information.

The matching area determining unit 820 is an example of a definer, and determines a matching area based on the interpolation position information notified from the interpolation position information acquiring unit 810. When information indicating a plurality of positions is included in the interpolation position information, the matching area determining unit 820 determines a matching area for each piece of information indicating one of the positions. The matching area determining unit 820 notifies the read out control unit 840 of the determined matching area.

The image data acquiring unit 830 acquires image data generated based on the signals detected by the respective elements of the reading device 116, and stores the acquired image data in the line buffer 510.

The read out control unit 840 is an example of a determining unit, and determines whether the pixel that is the processing target is included in the matching area notified from the matching area determining unit 820.

Furthermore, the read out control unit 840 is also an example of a read out control unit. When it is determined that the pixel that is the processing target is not included in the matching area, the read out control unit 840 sets an address corresponding to the pixel that is the processing target, as a read out address (an address indicating the read out destination in the line buffer 510). Furthermore, the read out control unit 840 accesses the line buffer 510 based on the set read out address, reads out the pixel value, and transmits the pixel value to the output control unit 860.

Furthermore, when if it is determined that the pixel that is the processing target is included in the matching area, the read out control unit 840 identifies the addresses corresponding to the respective pixels included in the matching area. Furthermore, the read out control unit 840 sets the leading address of the identified addresses as a read out address, and accesses the line buffer 510 to sequentially read out the pixel values of the respective pixels included in the matching area. Furthermore, the read out control unit 840 stores the pixel values sequentially read out from the line buffer 510, in the matching process buffer 520.

More specifically, the read out address, at the time when the matching process is completed for the Nth matching area, is the address corresponding to the last pixel in the Nth matching area. Therefore, when the next pixel that is the processing target is included in the (N+1)th matching area, the read out control unit 840 changes the setting of the read out addresses, by using the leading address of the addresses corresponding to the pixels included in the (N+1)th matching area. Accordingly, the read out control unit 840 can sequentially read out the pixel values of the pixels included in the (N+1)th matching area, from the line buffer 510.

The matching processing unit 850 is an example of an interpolation unit. When all of the pixel values of the respective pixels included in the matching area are stored in the matching process buffer 520, the matching processing unit 850 performs a matching process based on previously prepared pattern data, and calculates the pixel value of the interpolation pixel. Upon completion of the matching process, the matching processing unit 850 notifies the read out control unit 840 of the completion and transmits the calculated pixel value of the interpolation pixel to the output control unit 860.

The output control unit 860 is an example of an output control unit, and when the pixel that is the processing target is not included in the matching area, the pixel value of the pixel that is the processing target transmitted from the read out control unit 840 is stored in the output buffer 530.

Furthermore, when the pixel that is the processing target is included in the matching area, the output control unit 860 inserts the pixel value of the interpolation pixel transmitted from the matching processing unit 850, at the position corresponding to the missing pixel among the respective pixels stored in the matching process buffer 520. Furthermore, when the matching area does not overlap another matching area, the output control unit 860 stores, in the output buffer 530, the pixel values of the respective pixels, in which the pixel value of the interpolation pixel has been inserted. Conversely, when the matching area overlaps another matching area, the output control unit 860 stores, in the output buffer 530, the pixel values of pixels other than the pixels corresponding to the overlapping area, among the pixels in which the pixel value of the interpolation pixel has been inserted.

<5. Flow of Image Processing-Third Embodiment>

Figure 16:
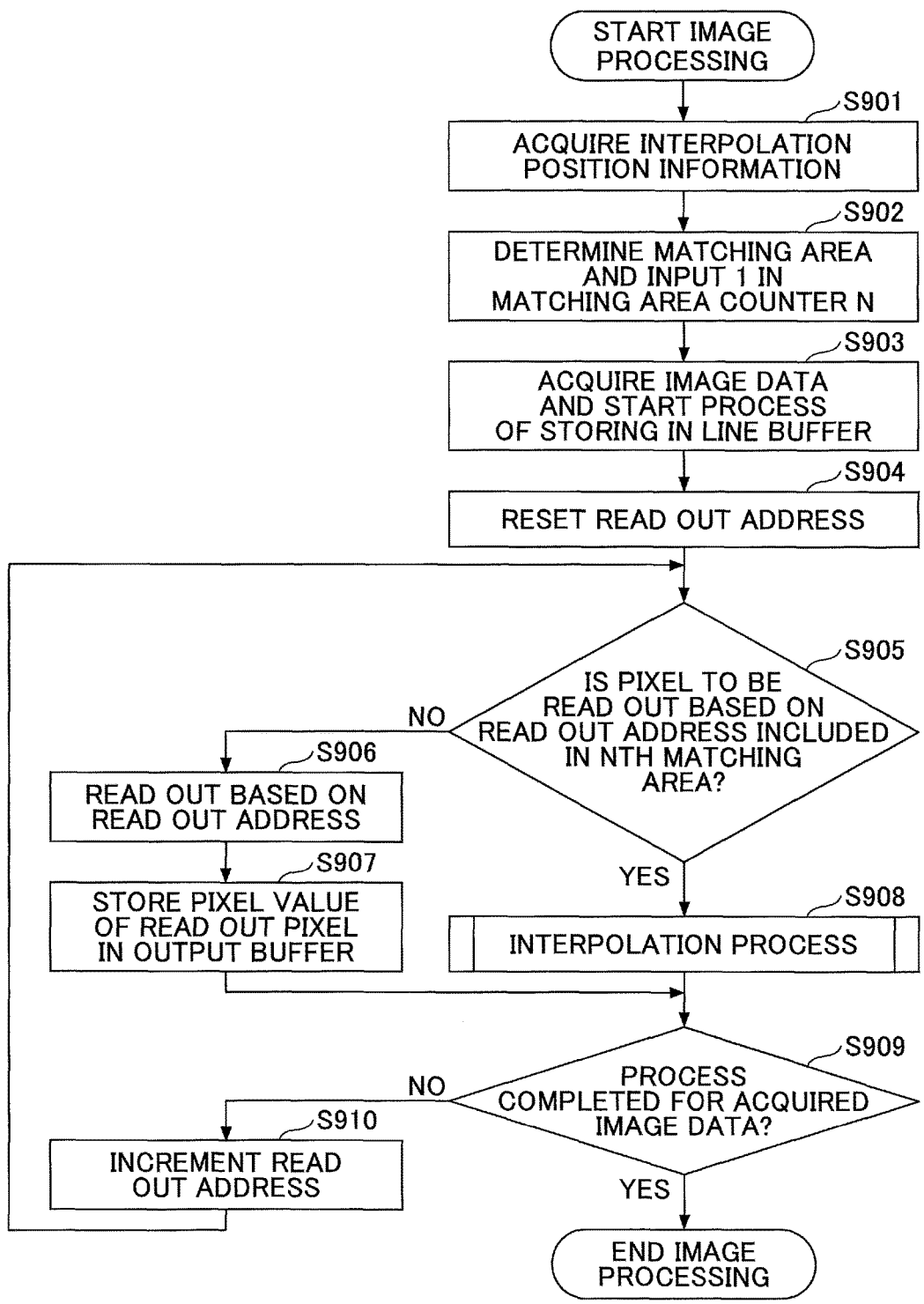
FIG. 16 is a flowchart illustrating the flow by image processing by the image processing device according to the third embodiment of the present invention.

Next, the flow of image processing by the image processing device 114 will be described. FIG. 16 is a flowchart illustrating the flow by image processing by the image processing device 114. When scanning by the reading device 116 is started, the image processing device 114 starts the flow of the flowchart illustrated in FIG. 16. Note that the flow of image processing for image data of one line will be described here.

In step S901, the interpolation position information acquiring unit 810 acquires interpolation position information and notifies the matching area determining unit 820 of the interpolation position information.

In step S902, the matching area determining unit 820 determines the matching area based on the interpolation position information. Furthermore, the matching area determining unit 820 inputs 1 to the matching area counter N that counts the matching area (an integer of 1 or more can be input to N).

In step S903, the image data acquiring unit 830 acquires the image data from the reading device 116, and starts a process of storing the image data in the line buffer 510. Thereafter, the process is continued until the image data of one line is acquired, and storage of the image data in the line buffer 510 is completed.

In step S904, the read out control unit 840 resets the read out address.

In step S905, the read out control unit 840 determines whether the pixel of the read out destination to be read out based on the current read out address, is included in the Nth matching area.

In step S905, when the read out control unit 840 determines that the pixel is not included in the Nth matching area (NO in step S905), the process proceeds to step S906. In step S906, the read out control unit 840 accesses the line buffer 510 based on the current read out address, reads out the pixel value, and transmits the pixel value to the output control unit 860.

In step S907, the output control unit 860 stores the transmitted pixel value in the output buffer 530.

Conversely, when the read out control unit 840 determines that the pixel is included in the Nth matching area (YES in step S905), the process proceeds to step S908. In step S 908, the read out control unit 840, the matching processing unit 850, and the output control unit 860 execute an interpolation process. The details of the interpolation process will be described later.

In step S909, the read out control unit 840 determines whether the process on the acquired image data is completed. In step S909, when the read out control unit 840 determines that the process is not completed (NO in step S909), the process proceeds to step S910.

In step S910, the read out control unit 840 increments the read out address and returns to step S905.

Conversely, when the read out control unit 840 determines that the process is completed (YES in step S909), the image processing is ended.

<4. Details of Interpolation Process-Third Embodiment>

Figure 17:
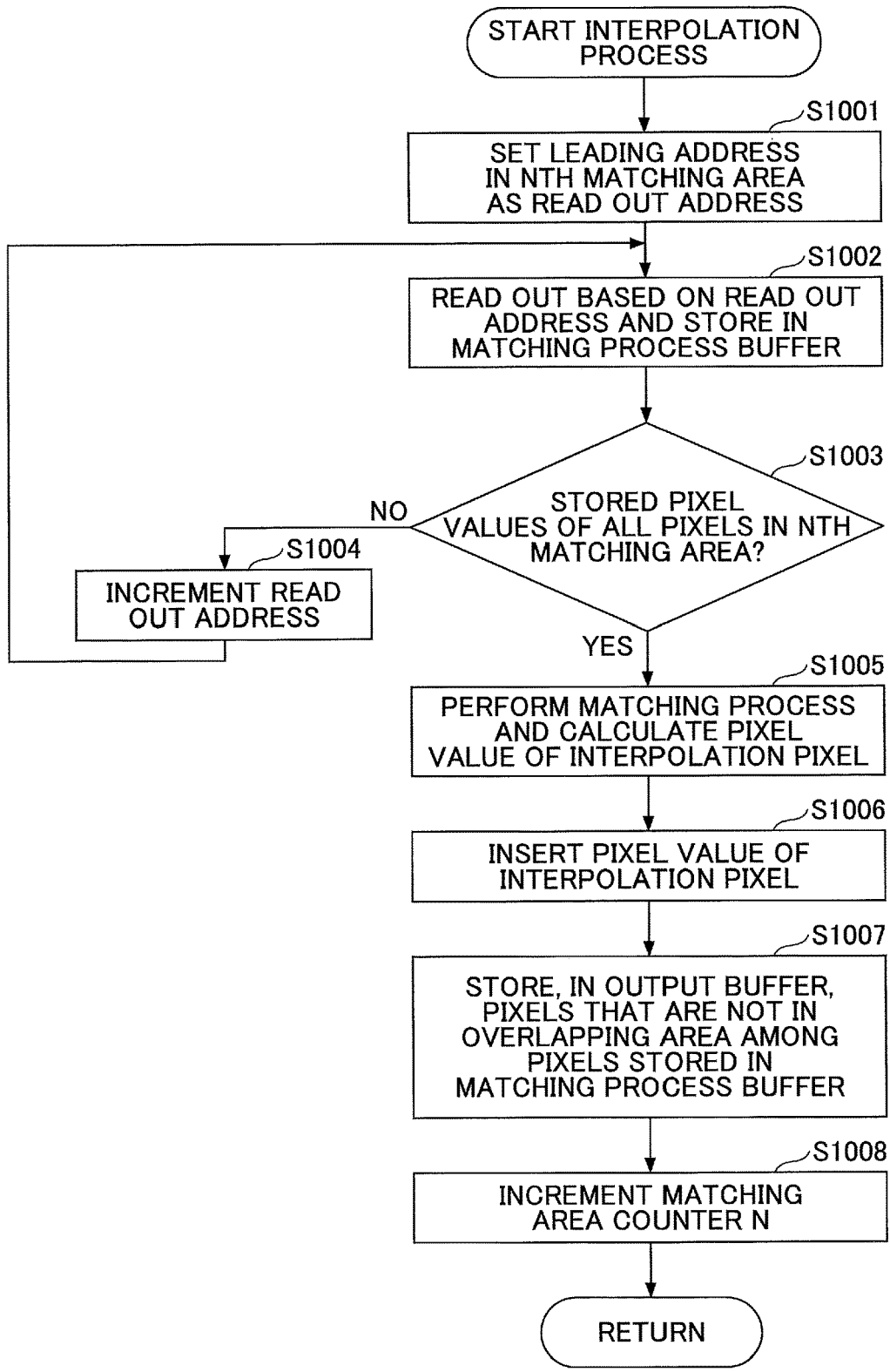
FIG. 17 is a flowchart illustrating the flow of the interpolation process according to the third embodiment of the present invention.

Next, the details of the interpolation process (step S908 in FIG. 16) will be described. FIG. 17 is a flowchart illustrating the flow of the interpolation process.

In step S1001, the read out control unit 840 sets the leading address of the addresses corresponding to the respective pixels included in the Nth matching area, as a read out address.

In step S1002, the read out control unit 840 accesses the line buffer 510 based on the read out address set in step S1001, reads out the pixel value of the corresponding pixel, and stores the pixel value in the matching process buffer 520.

In step S1003, the read out control unit 840 determines whether the pixel values of all of the pixels included in the Nth matching area are stored in the matching process buffer 520. In step S1003, when the read out control unit 840 determines that there is a pixel value of a pixel that is not stored (NO in step S1003), the process proceeds to step S1004.

In step S1004, the read out control unit 840 increments the read out address and returns to step S1002.

Conversely, when the read out control unit 840 determines that the pixel values of all of the pixels have been stored in the matching process buffer 520 (YES in step S1003), the process proceeds to step S1005.

In step S1005, the matching processing unit 850 performs a matching process based on previously prepared pattern data, by using the pixel values of the respective pixels stored in the matching process buffer 520, and calculates the pixel value of the interpolation pixel.

In step S1006, the output control unit 860 inserts the pixel value of the interpolation pixel at the position corresponding to the missing pixel, among the pixels stored in the matching process buffer 520.

In step S1007, the output control unit 860 stores, in the output buffer 530, the pixel values of the pixels excluding the pixels in the overlapping area, among of the pixel values of the pixels into which the pixel value of the interpolation pixel has been inserted. When there is no pixel in the overlapping area, the output control unit 860 stores, in the output buffer 530, the pixels into which the pixel value of the interpolation pixel has been inserted.

In step S1008, the read out control unit 840 increments the matching area counter N and returns to step S909 in FIG. 16.

<5. Overview-Third Embodiment>

As is apparent from the above description, the image processing device 114 according to the present embodiment performs the following contents.

The image processing device 114 acquires image data of one line in the main scanning direction, generated based on signals of the elements of the reading device, and stores the image data in the line buffer.

The image processing device 114 determines whether the pixel, which is the next processing target after the process of interpolating the Nth missing pixel is performed based on the pixel values of the respective pixels included in the Nth matching area, is included in the (N+1)th matching area.

When the image processing device 114 determines that the next pixel is included in the (N+1)th matching area, the image processing device 114 accesses the leading address of the addresses corresponding to the respective pixels included in the (N+1)th matching area, in the line buffer. Then, the image processing device 114 sequentially reads out the pixel values of the respective pixels included in the (N+1)th matching area.

The image processing device 114 uses the pixel values that have been read out, to calculate the pixel value of the (N+1)th interpolation pixel.

Thus, according to the image processing device 114, both in the case where the matching area overlaps another matching area and the case where the matching area does not overlap another matching area, all the pixel values of the respective pixels included in the matching area can be read out and stored in the matching process buffer.

As a result, according to the image processing device 114, both in the case where the matching area overlaps another matching area and the case where the matching area does not overlap another matching area, it is possible to appropriately perform a matching process, so that the pixel value of the interpolation pixel can be calculated.

Fourth Embodiment

In the third embodiment described above, the image processing device 114 determines a matching area formed of four preceding pixels and four succeeding pixels centered on the missing pixel; however, the method of determining the matching area is not limited as such. A predetermined number of pixels that is greater than or equal to five pixels before and after the missing pixel, may be determined as the matching area. Furthermore, the matching area may be determined by allocating different numbers of pixels before and after the missing pixel.

In the third embodiment, the matching process is performed by using predetermined pattern data. However, the matching process may be performed with different pattern data depending on the missing pixels.

Furthermore, in the third embodiment, a case where the matching areas overlap as a result of extending the matching areas has been described; however, by shortening the length of each of the plurality of sensor chips 210_1 to 210_n, for example, overlapping may occur. In this case also, according to the image processing device 114, the same interpolation process as in the third embodiment can be applied.

In the third embodiment, when the pixel value of the interpolation pixel is calculated, the pixel value is inserted at the position corresponding to the missing pixel. However, depending on the calculated pixel value, the pixel value may be configured to not be inserted at a position corresponding to the missing pixel. Furthermore, the position of inserting the pixel value of the interpolation pixel may not be the position corresponding to the missing pixel, but may be switched for each document.

Furthermore, in the third embodiment, a case where the image processing (FIG. 16, etc.) is executed by using an exclusive-use integrated circuit has been described. However, a computer formed by the CPU, the ROM, and the RAM may execute the image processing program to execute the image processing (FIG. 16).

Note that the present invention is not limited to the configurations indicated in the above embodiments, for example, the embodiments may be combined with other elements, etc. With respect to these aspects, it is possible to modify the present invention within a range not departing from the gist of the present invention, and the aspects can be appropriately determined according to the application forms.

According to one embodiment of the present invention, it is possible to calculate a pixel value of an interpolation pixel, even when a pixel area used for calculating the pixel value of the interpolation pixel overlaps another pixel area.

The image processing apparatus, the image processing method, and the recording medium are not limited to the specific embodiments described in the detailed description, and variations and modifications may be made without departing from the spirit and scope of the present invention.

What is claimed is:

1. An image processing apparatus comprising:
a definer configured to define one or more pixel areas in image data that is acquired on a per-line basis in a main scanning direction, each of the one or more pixel areas being used for calculating a pixel value of an interpolation pixel for interpolating a missing pixel;
a read out controller configured to access, in a memory storing the image data of one line, a leading address among addresses corresponding to respective pixels included in an Nth pixel area of the pixel areas defined by the definer, the N being an integer of one or more, and to sequentially read out pixel values of the respective pixels included in the Nth pixel area; and
a calculator configured to calculate a pixel value of an Nth interpolation pixel of the interpolation pixels by using the pixel values of the respective pixels included in the Nth pixel area read out by the read out controller, wherein
the read out controller accesses, in the memory storing the image data of one line, a leading address among addresses corresponding to respective pixels included in an (N+1)th pixel area of the defined pixel areas, and sequentially reads out pixel values of the respective pixels included in the (N+1)th pixel area, upon completion of the calculation of the pixel value of the Nth interpolation pixel.

2. The image processing apparatus according to claim 1, wherein the definer defines, as the one or more pixel areas, a pixel area centered on a position of the missing pixel.

3. The image processing apparatus according to claim 2, wherein the calculator calculates the pixel value of the Nth interpolation pixel, by performing a matching process based on predetermined pattern data by using the pixel values of the respective pixels included in the Nth pixel area read out by the read out controller.

4. The image processing apparatus according to claim 3, wherein the calculator calculates, as the pixel value of the Nth interpolation pixel, a pixel value of a pixel determined in accordance with a matching degree with the predetermined pattern data.

5. The image processing apparatus according to claim 4, wherein the calculator calculates the matching degree by calculating an absolute difference value, with respect to the predetermined pattern data.

6. The image processing apparatus according to claim 1, further comprising:
a determiner configured to determine whether a pixel that is a next processing target is included in the (N+1)th pixel area, upon completion of the calculation of the pixel value of the Nth interpolation pixel by using the pixel values of the respective pixels included in the Nth pixel area, wherein
the read out controller accesses, in the memory storing the image data of one line, the leading address among the addresses corresponding to the respective pixels included in the (N+1)th pixel area, and sequentially reads out the pixel values of the respective pixels included in the (N+1)th pixel area, upon determining that the pixel that is the next processing target is included in the (N+1)th pixel area upon completion of the calculation of the pixel value of the Nth interpolation pixel.

7. The image processing apparatus according to claim 6, wherein the calculator calculates a pixel value of a (N+1)th interpolation pixel of the interpolation pixels, by performing a matching process based on pattern data that vary according to the one or more pixel areas, by using the pixel values of the respective pixels included in the (N+1)th pixel area read out by the read out controller.

8. The image processing apparatus according to claim 6, further comprising:
an output controller configured to
insert the pixel value of the (N+1)th interpolation pixel at a position corresponding to a (N+1)th missing pixel of the missing pixels, among the respective pixels included in the (N+1)th pixel area read out by the read out controller, and
store the pixel value of the (N+1)th interpolation pixel in an output buffer, together with the pixel values of the respective pixels included in the (N+1)th pixel area.

9. The image processing apparatus according to claim 8, wherein the output controller stores the pixel value of the (N+1)th interpolation pixel in the output buffer, together with the pixel values of the respective pixels included in the (N+1)th pixel area excluding pixels included an overlapping area where the Nth pixel area and the (N+1)th pixel area overlap each other.

10. The image processing apparatus according to claim 6, wherein the read out controller accesses, in the memory storing the image data of one line, an address corresponding to the pixel that is the next processing target, and reads out a pixel value of the pixel that is the next processing target, upon determining that the pixel that is the next processing target is not included in the (N+1)th pixel area.

11. The image processing apparatus according to claim 6, wherein the definer defines, as the one or more pixel areas, a pixel area centered on a position of the missing pixel.

12. An image processing method comprising:
defining one or more pixel areas in image data that is acquired on a per-line basis in a main scanning direction, each of the one or more pixel areas being used for calculating a pixel value of an interpolation pixel for interpolating a missing pixel;
accessing, in a memory storing the image data of one line, a leading address among addresses corresponding to respective pixels included in an Nth pixel area of the defined pixel areas, the N being an integer of one or more, and sequentially reading out pixel values of the respective pixels included in the Nth pixel area; and
calculating a pixel value of an Nth interpolation pixel of the interpolation pixels by using the read out pixel values of the respective pixels included in the Nth pixel area, wherein
the accessing includes accessing, in the memory storing the image data of one line, a leading address among addresses corresponding to respective pixels included in an (N+1)th pixel area of the defined pixel areas, and sequentially reading out pixel values of the respective pixels included in the (N+1)th pixel area, upon completion of the calculation of the pixel value of the Nth interpolation pixel.

13. The image processing method according to claim 12, further comprising:
determining whether a pixel that is a next processing target is included in the (N+1)th pixel area, upon completion of the calculation of the pixel value of the Nth interpolation pixel by using the pixel values of the respective pixels included in the Nth pixel area, wherein
the accessing includes accessing, in the memory storing the image data of one line, the leading address among the addresses corresponding to the respective pixels included in the (N+1)th pixel area, and sequentially reading out the pixel values of the respective pixels included in the (N+1)th pixel area, upon determining that the pixel that is the next processing target is included in the (N+1)th pixel area upon completion of the calculation of the pixel value of the Nth interpolation pixel.

14. A non-transitory computer-readable recording medium storing a program that causes a computer to execute a process, the process comprising:
defining one or more pixel areas in image data that is acquired on a per-line basis in a main scanning direction, each of the one or more pixel areas being used for calculating a pixel value of an interpolation pixel for interpolating a missing pixel;
accessing, in a memory storing the image data of one line, a leading address among addresses corresponding to respective pixels included in an Nth pixel area of the defined pixel areas, the N being an integer of one or more, and sequentially reading out pixel values of the respective pixels included in the Nth pixel area; and
calculating a pixel value of an Nth interpolation pixel of the interpolation pixels by using the read out pixel values of the respective pixels included in the Nth pixel area, wherein
the accessing includes accessing, in the memory storing the image data of one line, a leading address among addresses corresponding to respective pixels included in an (N+1)th pixel area of the defined pixel areas, and sequentially reading out pixel values of the respective pixels included in the (N+1)th pixel area, upon completion of the calculation of the pixel value of the Nth interpolation pixel.

15. The non-transitory computer-readable recording medium according to claim 14, the process further comprising:
determining whether a pixel that is a next processing target is included in the (N+1)th pixel area, upon completion of the calculation of the pixel value of the Nth interpolation pixel by using the pixel values of the respective pixels included in the Nth pixel area, wherein
the accessing includes accessing, in the memory storing the image data of one line, the leading address among the addresses corresponding to the respective pixels included in the (N+1)th pixel area, and sequentially reading out the pixel values of the respective pixels included in the (N+1)th pixel area, upon determining that the pixel that is the next processing target is included in the (N+1)th pixel area upon completion of the calculation of the pixel value of the Nth interpolation pixel.

* * * * *